United States Patent
Wada et al.

(10) Patent No.: US 10,158,437 B2
(45) Date of Patent: Dec. 18, 2018

(54) WIRELESS ANALYSIS APPARATUS AND WIRELESS ANALYSIS METHOD

(71) Applicant: FUJITSU LIMITED, Kawasaki-shi, Kanagawa (JP)

(72) Inventors: Akihiro Wada, Kawasaki (JP); Tatsuya Kikuzuki, Sodegaura (JP); Teruhisa Ninomiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/674,080

(22) Filed: Aug. 10, 2017

(65) Prior Publication Data
US 2018/0083721 A1 Mar. 22, 2018

(30) Foreign Application Priority Data

Sep. 21, 2016 (JP) .................. 2016-183605

(51) Int. Cl.
| | | |
|---|---|---|
| *H04B 17/30* | (2015.01) | |
| *H04W 16/14* | (2009.01) | |
| *H04W 24/08* | (2009.01) | |
| *H04B 17/309* | (2015.01) | |
| *H04B 17/10* | (2015.01) | |

(52) U.S. Cl.
CPC ......... *H04B 17/309* (2015.01); *H04B 17/102* (2015.01); *H04W 16/14* (2013.01); *H04W 24/08* (2013.01)

(58) Field of Classification Search
CPC ........ H04B 17/00; H04B 17/18; H04B 17/30; H04B 17/382; H04W 16/00; H04W 16/14; H04W 24/08
See application file for complete search history.

(56) References Cited

U.S. PATENT DOCUMENTS

| | | | | |
|---|---|---|---|---|
| 7,903,767 | B2* | 3/2011 | Maeda | H04B 1/7075 |
| | | | | 375/342 |
| 9,143,968 | B1* | 9/2015 | Manku | H04W 24/08 |
| 9,832,774 | B2* | 11/2017 | Wu | H04W 72/0453 |
| 2004/0028123 | A1 | 2/2004 | Sugar et al. | |
| 2007/0281649 | A1 | 12/2007 | Maeda et al. | |
| 2008/0161035 | A1 | 7/2008 | Tomioka et al. | |

(Continued)

FOREIGN PATENT DOCUMENTS

| | | |
|---|---|---|
| JP | 2003-131688 A | 5/2003 |
| JP | 2007-303931 A | 11/2007 |
| JP | 2007-324754 A | 12/2007 |

(Continued)

*Primary Examiner* — Blane Jackson
(74) *Attorney, Agent, or Firm* — Arent Fox LLP

(57) ABSTRACT

There is provided a wireless analysis apparatus including: a memory unit configured to store information of electric power distribution indicating a temporal change of a frequency spectrum; and a computing unit configured to perform a procedure including: generating a plurality of divided regions having predetermined band widths by dividing the electric power distribution, calculating a temporal change amount of electric power with regard to each of the divided regions, detecting a rising portion and a falling portion of the electric power on the basis of the calculated temporal change amount, and identifying an individual signal component in the electric power distribution on the basis of the positions of the rising portion and the falling portion in the divided regions.

7 Claims, 18 Drawing Sheets

(56) References Cited

U.S. PATENT DOCUMENTS

2015/0208253 A1* 7/2015 Kim .................. H04W 24/02
370/252
2017/0272955 A1* 9/2017 Sadek ................. H04L 1/0001

FOREIGN PATENT DOCUMENTS

JP      2008-167200 A    7/2008
JP      2010-273019 A   12/2010

* cited by examiner

WIRELESS ANALYSIS APPARATUS AND WIRELESS ANALYSIS METHOD

CROSS-REFERENCE TO RELATED APPLICATION

This application is based upon and claims the benefit of priority of the prior Japanese Patent Application No. 2016-183605, filed on Sep. 21, 2016, the entire contents of which are incorporated herein by reference.

FIELD

The embodiments discussed herein relate to a wireless analysis apparatus and a wireless analysis method.

BACKGROUND

A communication volume increases and radio wave interference becomes more aggravated, with the increase of communication devices that utilize the frequency band called unlicensed band (2.4 GHz band). The congestion degree (band occupancy) of the radio wave environment is estimated for the purpose of taking measures against the radio wave interference. If the band occupancy is estimated for each wireless communication standard that uses the unlicensed band, a wireless communication standard having a large influence on the radio wave interference is identified. However, if the signals corresponding to a plurality of wireless communication standards are superimposed in time and frequency domains, and the superimposed signals fail to be separated correctly, there is a risk of erroneously determining the band occupancy of each wireless communication standard.

By the way, there is proposed a method for selecting an event, such as a start and a stop, of transmission by a communication device. In this method, temporal change of reception power in each frequency band is utilized as a reception feature value. In addition, an event, such as a transmission start and a transmission stop, of a communication device and a temporal change pattern of a transmission signal corresponding to the event are utilized as a transmission feature value. An event corresponding to the transmission feature value that is identical with the reception feature value is selected on the basis of comparison between the reception feature value and the transmission feature value.

Moreover, there is disclosed a method for generating information relevant to operation that occurs in a wireless frequency band. This method receives the energy of the wireless frequency band in which operation linked to a plurality of signal types can occur, and generates electric power values of a plurality of frequency components from a digital signal indicating the radio frequency energy received by the wireless frequency band. Also, an average electric power value is compared with a threshold value to generate information of a period during which the signal exists.

See, for example, Japanese Laid-open Patent Publication No. 2008-167200 and U.S. Patent Application Publication No. 2004/0028123.

Time points of a rising portion and a falling portion of signal power are detected by analyzing temporal change of signal power, and time points of a transmission start and a transmission stop are identified from the detected time points. Also, a period during which the signal power is larger than a threshold value is detected by comparing the signal power with the threshold value, in order to identify a period during which the signal exists. However, when a plurality of signals are superimposed and transmitted in the same band and during the same period, it is difficult to separate the individual signals in that band and period, even with the above method.

SUMMARY

According to one aspect, there is provided a wireless analysis apparatus including: a memory unit configured to store information of electric power distribution indicating a temporal change of a frequency spectrum; and a computing unit configured to perform a procedure including: generating a plurality of divided regions having predetermined band widths by dividing the electric power distribution, calculating a temporal change amount of electric power with regard to each of the divided regions, and detecting a rising portion and a falling portion of the electric power, based on the calculated temporal change amount, and identifying an individual signal component in the electric power distribution, based on positions of the rising portion and the falling portion in the plurality of divided regions.

The object and advantages of the invention will be realized and attained by means of the elements and combinations particularly pointed out in the claims.

It is to be understood that both foregoing general description and the following detailed description are exemplary and explanatory and are not restrictive of the invention.

DESCRIPTION OF EMBODIMENTS

Figure 1:
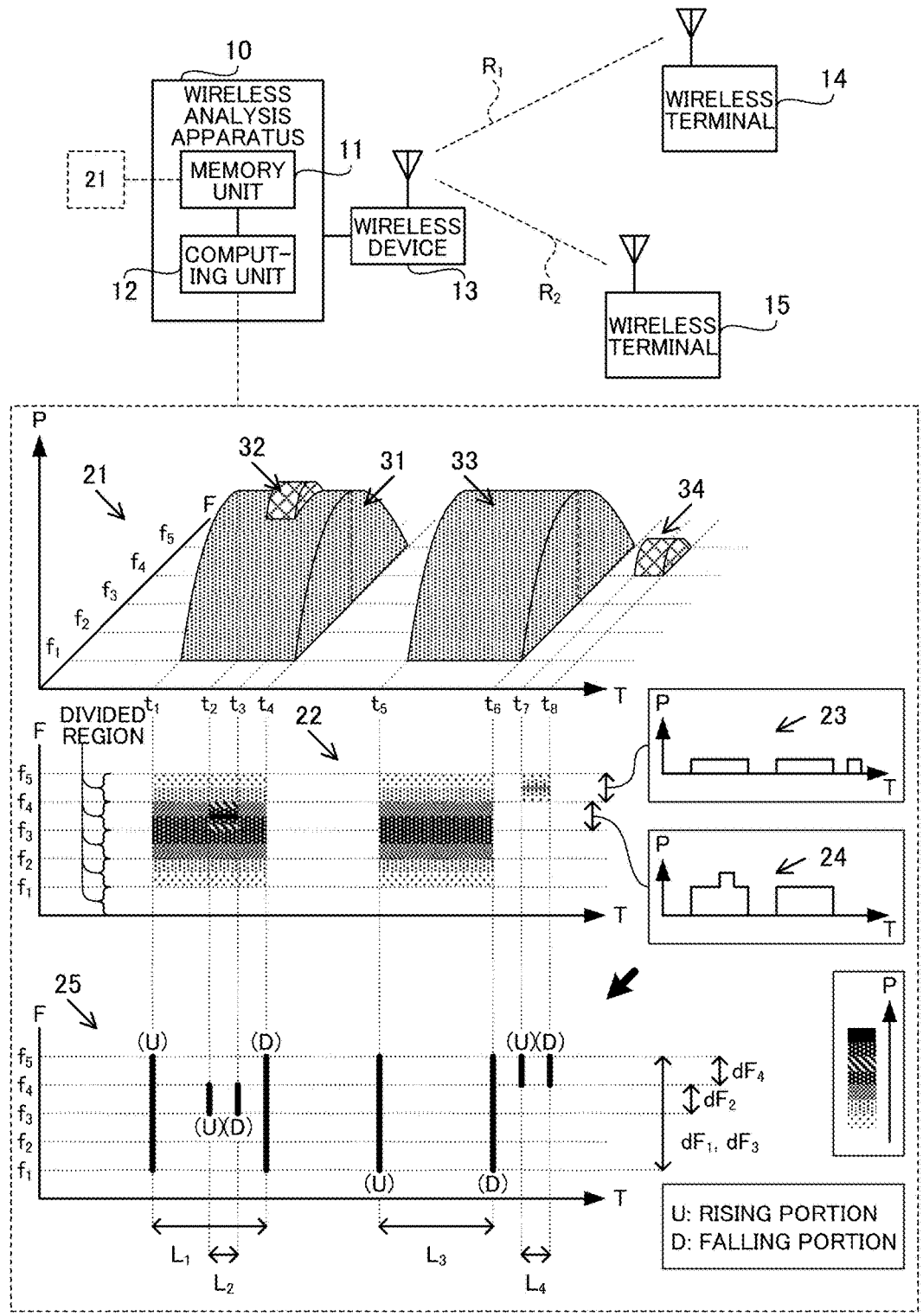
FIG. 1 illustrates an example of a wireless analysis apparatus according to a first embodiment.

Several embodiments will be described below with reference to the accompanying drawings, wherein like reference numerals refer to like elements throughout.

1. First Embodiment

A first embodiment will be described with reference to FIG. 1. The first embodiment relates to a method for analyzing electric power distribution (temporal change of a frequency spectrum) expressed by a graph having axes of frequency, time, and electric power in order to separate the signal components from each other in the electric power distribution. FIG. 1 illustrates an example of a wireless analysis apparatus according to the first embodiment. Note that the wireless analysis apparatus 10 illustrated in FIG. 1 is an example of the wireless analysis apparatus according to the first embodiment.

As illustrated in FIG. 1, the wireless analysis apparatus 10 includes a memory unit 11 and a computing unit 12. The memory unit 11 is a memory device, such as a random access memory (RAM), a hard disk drive (HDD), and a flash memory. The computing unit 12 is a processor, such as a central processing unit (CPU), a digital signal processor (DSP), an application specific integrated circuit (ASIC), and a field programmable gate array (FPGA). The computing unit 12 executes a program stored in the memory unit 11 or another memory, for example. Note that the function of the memory unit 11 may be provided by using a plurality of memory devices. The function of the computing unit 12 may be provided by using a plurality of processors or a processor including a plurality of cores.

The memory unit 11 stores information of electric power distribution 21 indicating a temporal change of a frequency spectrum. For example, the wireless analysis apparatus 10 is connected to a wireless device 13 that receives radio waves flying through air via a reception antenna, as illustrated in FIG. 1. The computing unit 12 stores in the memory unit 11 the information of the frequency spectrum of radio waves received by the wireless device 13.

In the example of FIG. 1, the wireless device 13 receives the radio waves output from wireless terminals 14 and 15. For example, the wireless terminal 14 transmits a signal of a wireless communication standard $R_1$ (wireless local area network (WLAN), etc.). The wireless terminal 15 transmits a signal of a wireless communication standard $R_2$ (Bluetooth (registered trademark), ZigBee (registered trademark), etc.). Hence, the signals of the wireless communication standards $R_1$ and $R_2$ are mixed in the radio waves received by the wireless device 13.

The electric power distribution 21 is expressed by a graph of a space having axes of time T, frequency F, and electric power P, as illustrated in FIG. 1. In the example of FIG. 1, the electric power distribution 21 includes signal components 31 and 33 derived from the signal of the wireless communication standard $R_1$ and signal components 32 and 34 derived from the signal of the wireless communication standard R2. The signal components 33 and 34 are separated from each other on the time axis. Hence, the signal components 33 and 34 are separated by detecting an area of a larger electric power P than a predetermined threshold value.

On the other hand, the signal components 31 and 32 are superimposed. Hence, the signal components 31 and 32 are not separated from each other, even by detecting an area of a larger electric power P than a predetermined threshold value. Thus, the computing unit 12 identifies each of the signal components 31 and 32 from the electric power distribution 21, by executing the process described below. Note that, for the convenience of description, the following description utilizes two-dimensional electric power distribution 22 that employs gray-scale expression for a value on the electric power axis in the three-dimensional electric power distribution 21.

The computing unit 12 generates a plurality of divided regions having predetermined band widths by dividing the electric power distribution 22 (electric power distribution 21). In the example of FIG. 1, four divided regions are generated by dividing the electric power distribution 22 in the frequency direction at frequencies $f_1$, $f_2$, $f_3$, $f_4$, and $f_5$. Note that the predetermined band widths are set equal to or narrower, within an acceptable error range, than the narrowest band width among the band widths specified by the wireless communication standards $R_1$ and $R_2$ (the wireless communication standards set as analysis targets in advance), for example.

The computing unit 12 calculates a temporal change amount of the electric power P from the time transition of the electric power P, with regard to each of the divided regions. For example, FIG. 1 illustrates time transition 23 of the electric power P in the divided region between the frequencies $f_4$ and $f_5$ and time transition 24 of the electric power P in the divided region between the frequencies $f_3$ and $f_4$. The temporal change amount of the electric power P is a differential value obtained by differentiating the time transition of the electric power P in the time direction. Note that, in numerical calculation, a difference value between the electric power P in a section having a predetermined width on the time axis and the electric power P in an adjacent section can be utilized as the temporal change amount of the electric power P. The computing unit 12 detects rising portions U and falling portions D of the electric power P on the basis of the calculated temporal change amount.

Note that an edge map 25 indicating the positions of the rising portions U and the falling portions D is obtained by displaying the detected rising portions U and the falling portions D on the time-frequency plane.

The computing unit 12 identifies each of the signal components 31, 32, 33, and 34 in the electric power distribution 21 on the basis of the positions of the rising portions U and the falling portions D in the divided regions.

For example, the computing unit 12 extracts features, such as a band width (length in the frequency axis direction; $dF_1$, $dF_2$, $dF_3$, and $dF_4$), a center frequency, and a shape of a frequency spectrum, from the edge map 25, with regard to each edge. Also, the computing unit 12 selects a pair of a rising portion U and a falling portion D having similar extracted features. Then, the computing unit 12 identifies the area from the selected rising portion U to the selected falling portion D as one signal component.

When selecting a pair, the computing unit 12 executes the following process, for example. The computing unit 12 selects one rising portion U. Also, the computing unit 12 detects the falling portion D whose frequency spectrum is of the largest cross-correlation with the frequency spectrum of the selected rising portions U, from among the falling portions D positioned after the selected rising portions U (backward in the time axis). Then, the computing unit 12 pairs the selected rising portion U and the detected falling portion D. In the same way, the computing unit 12 sequentially selects the rising portions U that have not been selected in order to make pairs.

When the individual signal components are separated from each other, the band widths $dF_1$, $dF_2$, $dF_3$, and $dF_4$ and the signal lengths $L_1$, $L_2$, $L_3$, and $L_4$ of the respective signal components are obtained. When information of the band widths $dF_1$, $dF_2$, $dF_3$, and $dF_4$ are obtained, the wireless communication standards $R_1$ and $R_2$ corresponding to the individual signal components are identified. In addition, information of the number of signals of each wireless communication standard in the electric power distribution 21 is obtained. Thus, communication control, such as reduction of cross talk, is performed efficiently.

In the above, the first embodiment has been described.

2. Second Embodiment

Next, a second embodiment will be described. The second embodiment relates to a method for analyzing temporal change (electric power distribution) of a frequency spectrum and separates signal components from each other in the electric power distribution.

[2-1. System]

Figure 2:
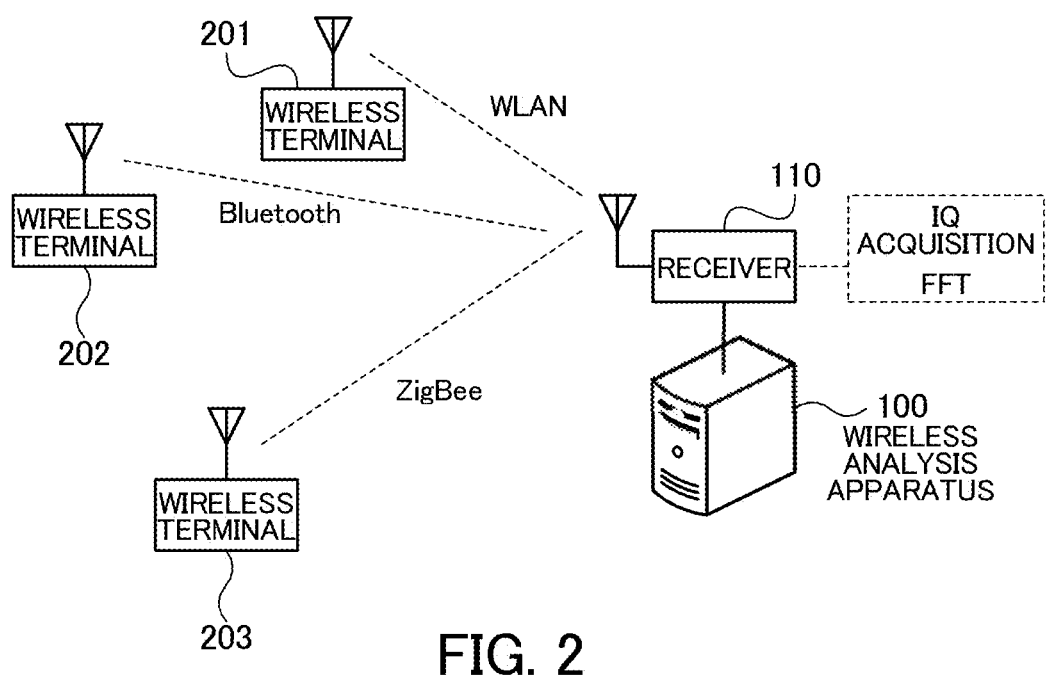
FIG. 2 illustrates an example of a wireless communication system according to a second embodiment.

First, a wireless communication system according to the second embodiment will be described with reference to FIG. 2. FIG. 2 illustrates an example of the wireless communication system according to the second embodiment.

The wireless communication system illustrated in FIG. 2 includes a wireless analysis apparatus 100 and wireless terminals 201, 202, and 203. Here, the number of wireless terminals is three for example, but the wireless communication system may include wireless terminals of any number.

The wireless analysis apparatus 100 is a computer, such as a personal computer (PC) and a server apparatus. A receiver 110 having an antenna is connected to the wireless analysis apparatus 100. Note that the wireless analysis apparatus 100 may be a smartphone or a tablet terminal for example, besides the PC and the server apparatus. Also, the wireless analysis apparatus 100 may be a base station of near field communication, such as an access point of a wireless LAN and a master of Bluetooth. Also, the wireless analysis apparatus 100 may be a wireless gateway or a base station of mobile communication, for example. Also, the wireless analysis apparatus 100 may be contained in the receiver 110.

The receiver 110 receives a radio frequency (RF) signal via the antenna and generates a frequency spectrum of the received RF signal. For example, the receiver 110 executes a process for extracting an in-phase component and a quadrature-phase component from the RF signal by using a carrier wave and a process for converting a signal in the time domain to a signal in the frequency domain by fast fourier transform (FFT). The frequency spectrum obtained by these processes is input into the wireless analysis apparatus 100.

Each of the wireless terminals 201, 202, and 203 is a computer such as a PC, a mobile terminal such as a mobile phone and a smartphone, or a wireless device such as a base station and a relay station, for example. The wireless terminal 201 transmits a signal by a WLAN method. The wireless terminal 202 transmits a signal by a Bluetooth method. The wireless terminal 203 transmits a signal by a ZigBee method. Although in the example of FIG. 2 the wireless standard is WLAN, Bluetooth, or ZigBee for the convenience of description, wireless standards other than WLAN, Bluetooth, and ZigBee may be employed in the technology of the second embodiment.

When signals are transmitted, the receiver 110 detects the radio waves output from the wireless terminals 201, 202, and 203. When at least two of the wireless terminals 201, 202, and 203 transmit signals simultaneously, a plurality of signal components are mixed in the radio waves detected by the receiver 110. Hence, a plurality of signal components are included in the frequency spectrum input into the wireless analysis apparatus 100 from the receiver 110. The wireless analysis apparatus 100 separates the individual signal components by analyzing the frequency spectrum input from the receiver 110.

A specification, such as band, band width, and center frequency, utilized in the wireless communication is specified in the wireless communication standard. However, the same band is utilized in different wireless communication standards, and therefore a plurality of signals are superimposed on each other when signals of different wireless standards are transmitted simultaneously. In this case, if a feature value (for example, band width) that is specified by each wireless communication standard and is different between the wireless communication standards is detected, the superimposed signals are separated into individual signals.

The wireless analysis apparatus 100 separates the individual signal components from the temporal change of the frequency spectrum (electric power distribution) generated by the receiver 110, and extracts the feature values of the superimposed signals. Then, the wireless analysis apparatus 100 identifies the wireless communication standard corresponding to each of the superimposed signals, on the basis of the extracted feature values. In the following, the wireless analysis apparatus 100 will be described further.

[2-2. Hardware]

Figure 3:
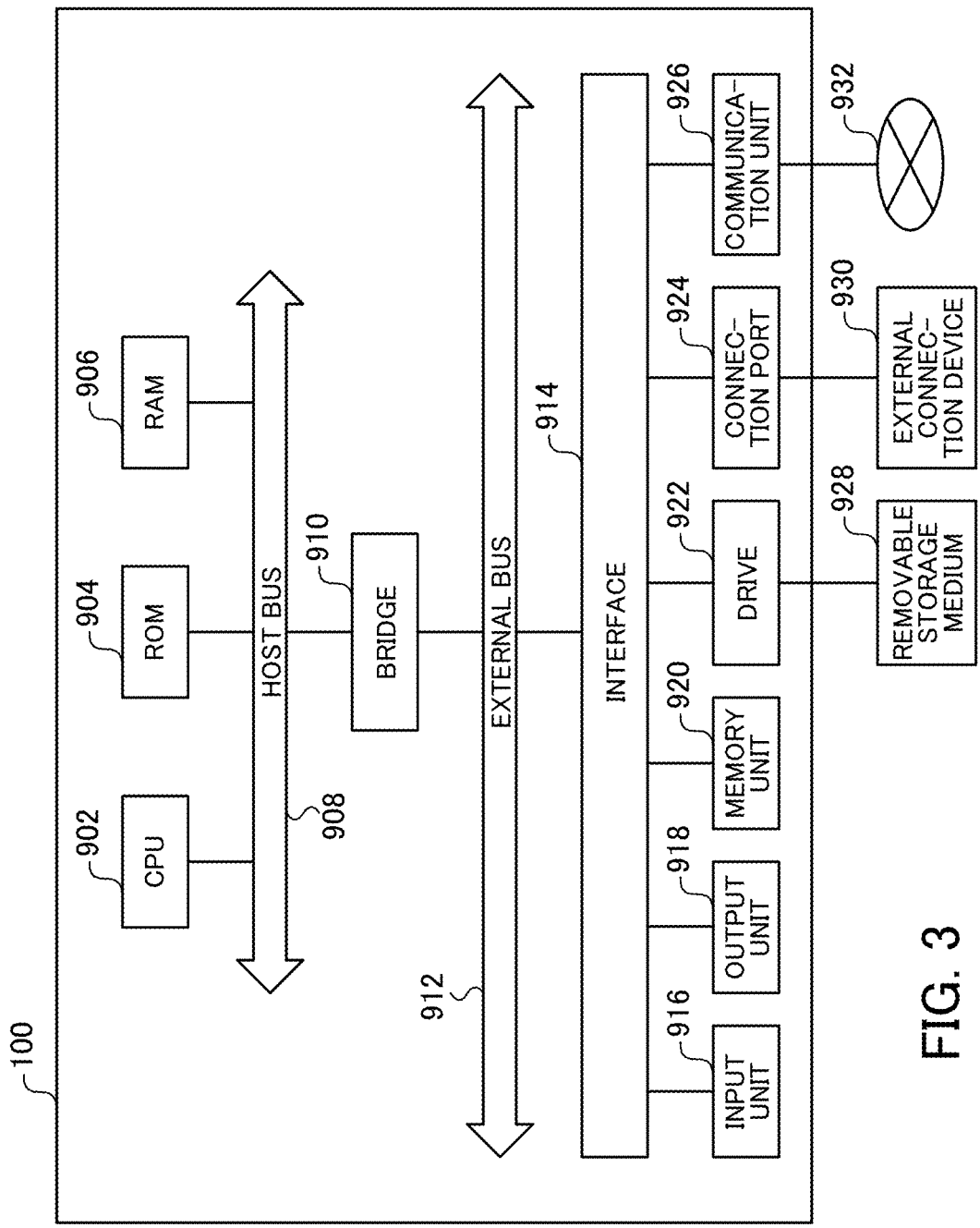
FIG. 3 is a block diagram that illustrates an example of hardware that provides functions of a wireless analysis apparatus according to the second embodiment.

Here, hardware that provides the functions of the wireless analysis apparatus 100 will be described with reference to FIG. 3. FIG. 3 is a block diagram that illustrates an example of the hardware that provides the functions of the wireless analysis apparatus according to the second embodiment.

The functions of the wireless analysis apparatus 100 are provided by using hardware resources illustrated in FIG. 3, for example. That is, the functions of the wireless analysis apparatus 100 are provided by controlling the hardware illustrated in FIG. 3 by using a computer program.

As illustrated in FIG. 3, this hardware mainly includes a CPU 902, a read only memory (ROM) 904, a RAM 906, a host bus 908, and a bridge 910. Further, this hardware includes an external bus 912, an interface 914, an input unit 916, an output unit 918, a memory unit 920, a drive 922, a connection port 924, and a communication unit 926.

For example, the CPU 902 functions as a processing device or a control device and controls operation of all components or a part thereof on the basis of various types of programs recorded in the ROM 904, the RAM 906, the memory unit 920, or a removable storage medium 928. The ROM 904 is an example of a memory device for storing programs to be executed in the CPU 902 and data used in calculation. For example, the programs read in the CPU 902 and various types of parameters that change during the execution of the program are temporarily or permanently stored in the RAM 906.

These elements are connected to each other via the host bus 908 capable of high speed data transmission, for example. On the other hand, the host bus 908 is connected to the external bus 912 of a comparatively low data transmission speed via the bridge 910, for example.

Also, a mouse, a keyboard, a touch panel, a touch pad, a button, a switch, a lever, or the like can be used as the input unit 916, for example.

For example, a display device, such as a cathode ray tube (CRT), a liquid crystal display (LCD), a plasma display panel (PDP), or an electro-luminescence display (ELD), may be used as the output unit 918. Also, a printer or the like may be used as the output unit 918.

The memory unit 920 is a device for storing various types of data. For example, a magnetic memory device, such as an HDD, is used as the memory unit 920. Also, a semiconductor memory device such as a solid state drive (SSD) and a RAM disk, an optical memory device, a magneto-optical memory device, or the like may be used as the memory unit 920.

The drive 922 is a device that reads out information from the removable storage medium 928 or writes information into the removable storage medium 928. For example, a magnetic disk, an optical disc, a magneto-optical disk, a semiconductor memory, or the like is used as the removable storage medium 928.

The connection port 924 is connected to an external connection device 930 and is, for example, a universal serial bus (USB) port, an IEEE1394 port, a small computer system interface (SCSI), an RS-232C port, or an optical audio terminal. For example, a printer or the like can be used as the external connection device 930.

The communication unit 926 is connected to a network 932. For example, the communication unit 926 is a wired or wireless LAN communication circuit, a wireless USB (WUSB) communication circuit, an optical communication circuit and router, an asymmetric digital subscriber line (ADSL) communication circuit and router, a mobile phone network communication circuit, or the like.

The network 932 connected to the communication unit 926 is a wired or wireless network, such as the Internet, a LAN, and the like. The receiver 110 is connected via the connection port 924 or the network 932, for example. Also, the function of the receiver 110 may be incorporated in the communication unit 926. In this case, the wireless analysis apparatus 100 and the receiver 110 are formed as one unit.

[2-3. Function]

Figure 4:
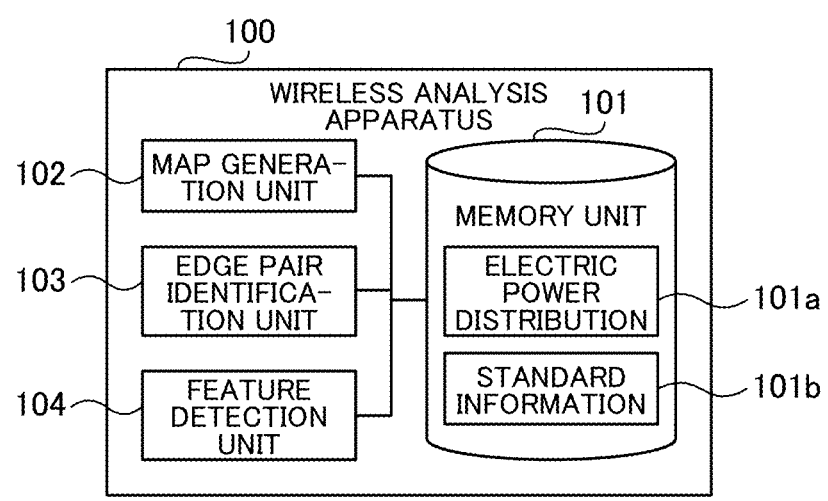
FIG. 4 is a block diagram that illustrates an example of functions of a wireless analysis apparatus according to the second embodiment.

Next, the functions of the wireless analysis apparatus 100 will be described with reference to FIG. 4. FIG. 4 is a block diagram that illustrates an example of the functions of the wireless analysis apparatus according to the second embodiment.

As illustrated in FIG. 4, the wireless analysis apparatus 100 includes a memory unit 101, a map generation unit 102, an edge pair identification unit 103, and a feature detection unit 104.

Note that the function of the memory unit 101 is provided by using the above RAM 906 and the memory unit 920, for example. The functions of the map generation unit 102, the edge pair identification unit 103, and the feature detection unit 104 are provided by using the above CPU 902, for example.

(Electric Power Distribution and Standard Information)

Figure 5:
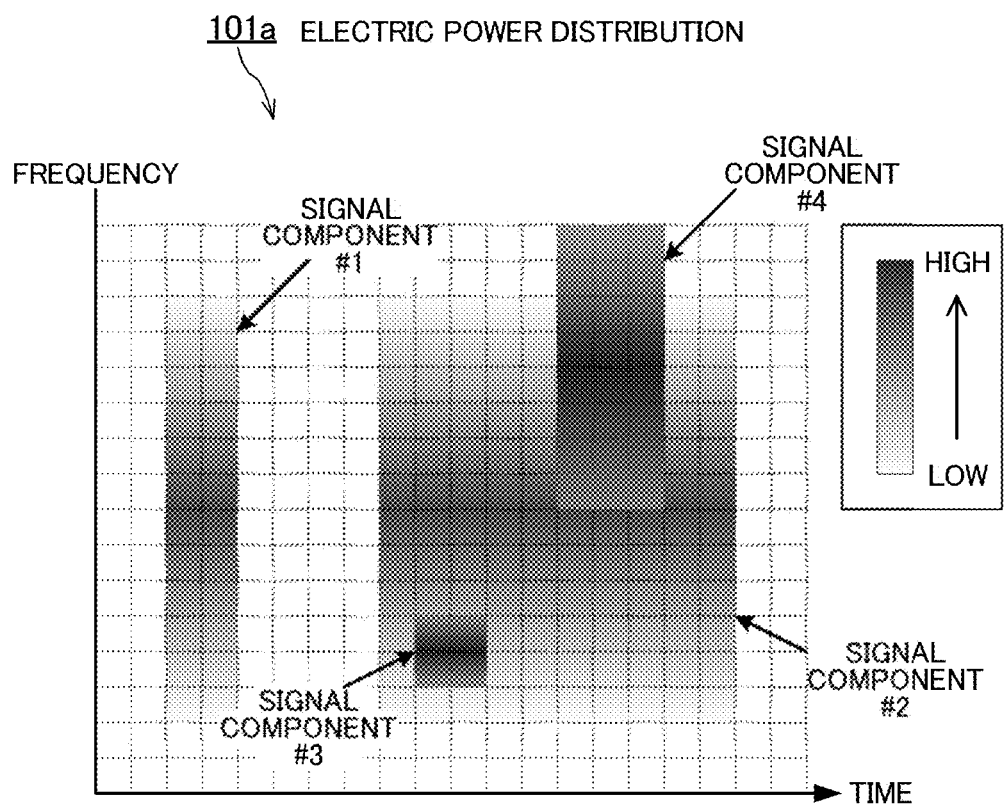
FIG. 5 is a diagram for describing electric power distribution according to the second embodiment.

Electric power distribution 101a and standard information 101b are stored in the memory unit 101. The electric power distribution 101a is information indicating temporal change of a frequency spectrum generated by the receiver 110. For example, the electric power distribution 101a is expressed by a heat map on a time-frequency plane (T-F plane), as illustrated in FIG. 5. Note that, in the heat map of FIG. 5, the magnitude of the electric power is expressed in gray scale. FIG. 5 is a diagram for describing the electric power distribution according to the second embodiment. The electric power distribution 101a at a certain time point is the frequency spectrum at that time point.

When the signals of different wireless standards are mixed, the electric power distribution 101a includes a plurality of signal components (signal components #1, . . . , #4 in the example of FIG. 5). Although, in the example of FIG. 5, the positions of the signal components #1, . . . , #4 are indicated with arrows for the convenience of description, the positions of the signal components #1, . . . , #4 are identified by using the functions of the map generation unit 102 and the edge pair identification unit 103 described later.

Figure 6:
FIG. 6 illustrates an example of standard information according to the second embodiment.

The standard information 101b indicates a correspondence relationship between wireless communication standards and the band widths specified by the wireless communication standards. For example, the standard information 101b is a table that associates information for identifying the wireless communication standards (names of the wireless communication standards in the example of FIG. 6) with band widths, as illustrated in FIG. 6. FIG. 6 illustrates an example of the standard information according to the second embodiment.

In the following, the band width corresponding to WLAN is denoted by $W_1$; the band width corresponding to Bluetooth is denoted by $W_2$; and the band width corresponding to ZigBee is denoted by $W_3$. Also, for the convenience of description, following description will be made, assuming that there is a relationship of $W_1 > W_3 > W_2$. Although the feature values associated with the wireless communication standards are the band widths, other feature values that are different between the wireless communication standards may be utilized, instead of the band widths. In this case, other feature values are associated with the wireless communication standards in the standard information 101b.

(Creation of Edge Map)

The map generation unit 102 analyzes the electric power distribution 101a and detects rising portions and falling portions (edges) of signal components in the electric power distribution 101a. In the following, a rising portion in the electric power distribution 101a is referred to as a rising edge, and a falling portion is referred to as a falling edge. Also, the map generation unit 102 generates an edge map that indicates the positions of the rising edges and the falling edges on a T-F plane.

Figure 7:
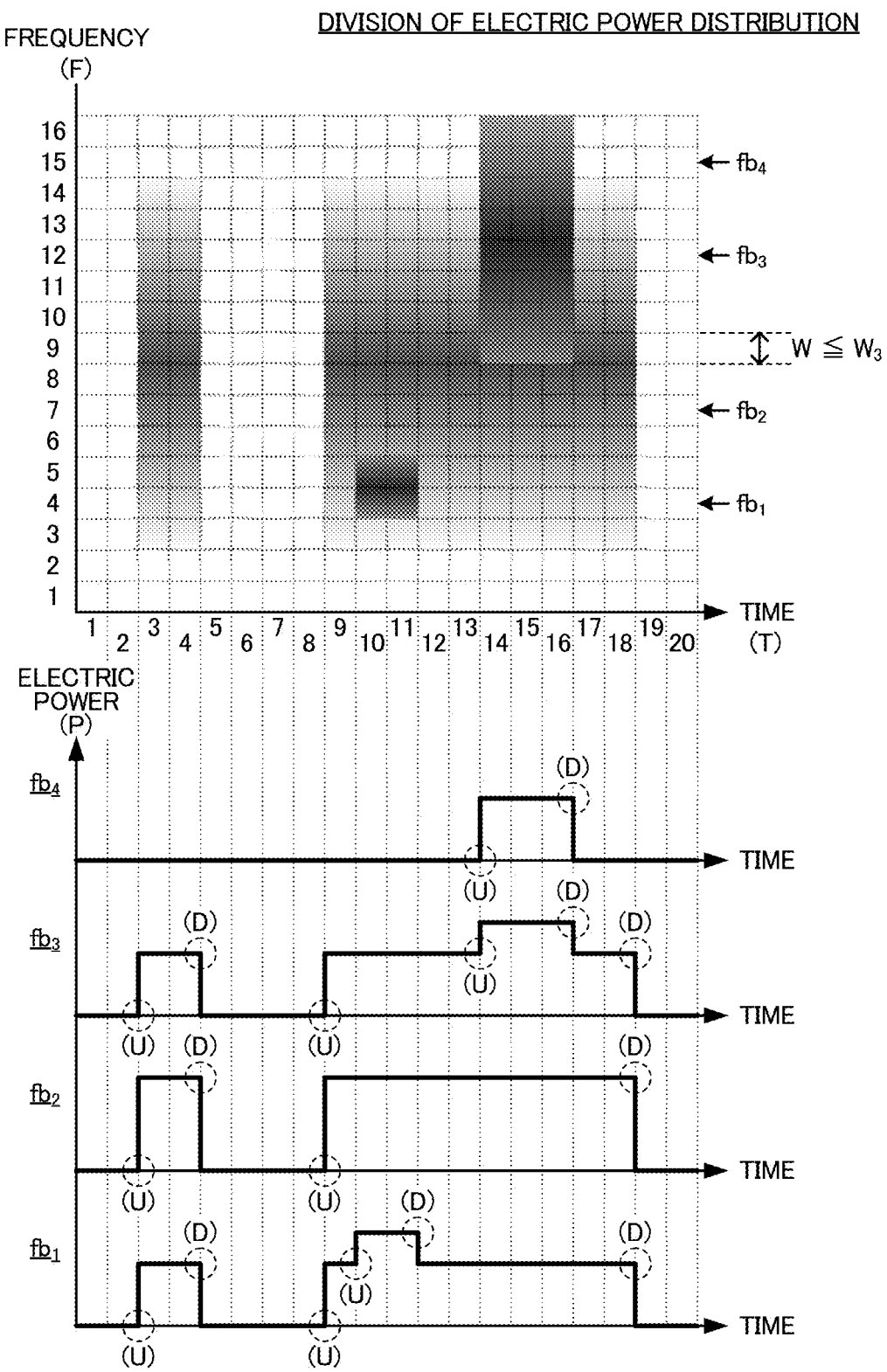
FIG. 7 is a diagram for describing an electric power distribution dividing method according to the second embodiment.

First, the map generation unit 102 divides the electric power distribution 101a into a plurality of divided regions having predetermined band widths W, as illustrated in FIG. 7. FIG. 7 is a diagram for describing an electric power distribution dividing method according to the second embodiment. The predetermined band widths W are set to the minimum band width ($W_3$ in this example) among the band widths in the standard information 101b.

Note that the predetermined band widths W may be set smaller than the minimum band width within an acceptable error range.

The map generation unit 102 performs edge detection to each divided region. Hence, if the band widths W are set larger than the minimum band width, there is a risk that the resolution becomes lower to such an extent that the signal component of the wireless standard corresponding to the minimum band width is unable to be detected. On the other hand, if the band widths W are set too small, there is a risk that a weak signal component is buried in noise (not illustrated in the drawings). In order to prevent these risks, the band widths W are set equal to or smaller than the minimum band width within an acceptable range in consideration of the influence of noise.

The map generation unit 102 detects rising edges (U) and falling edges (D) in each divided region on the basis of the temporal change amount (electric power change amount dP) of the electric power P, as illustrated in FIG. 7. FIG. 7 illustrates a detection example of the rising edges U and the falling edges D in four divided regions $fb_1$, $fb_2$, $fb_3$, and $fb_4$.

The map generation unit 102 compares the electric power P in a first section (current section) on the time axis with the electric power P in a second section (previous section) positioned before the first section, and if the electric power P of the current section is larger than the electric power P of the previous section, determines that there is a rising edge U at the boundary between the current section and the previous section. Conversely, if the electric power P of the current section is smaller than the electric power P of the previous section, the map generation unit 102 determines that there is a falling edge D at the boundary between the current section and the previous section.

Figure 8:
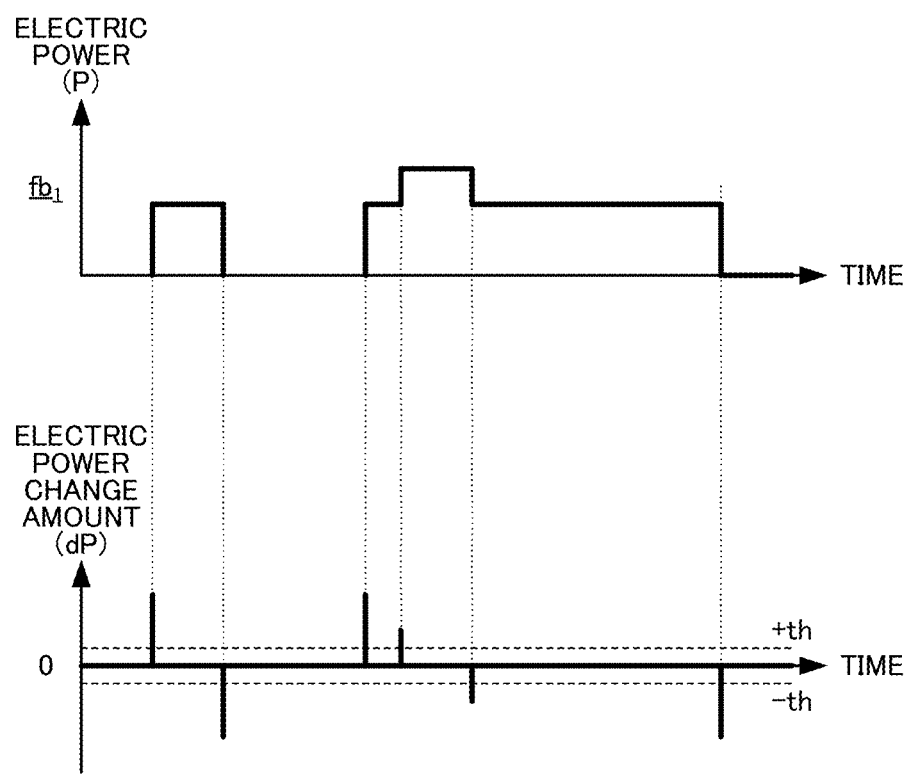
FIG. 8 is a diagram for describing an edge extraction method according to the second embodiment.

A predetermined threshold value th is used in the above determination. For example, the map generation unit 102 detects the rising edges U and the falling edges D by the method illustrated in FIG. 8. FIG. 8 is a diagram for describing an edge extraction method according to the second embodiment. Note that the threshold value th is set in advance on the basis of simulation or experiments for example, in such a manner that the edges corresponding to each signal component are detected at an acceptable accuracy even when the signals are superimposed.

The example of FIG. 8 illustrates a method for detecting the rising edges U and the falling edges D from the electric power change amount of the divided region $fb_1$ by using the threshold value th. In this example, the map generation unit 102 generates time-series data of the electric power change amount dP from time-series data of the electric power P in the divided region $fb_1$. Then, the map generation unit 102 determines that there are rising edges U at time points when the electric power change amount dP is larger than a threshold value +th. Also, the map generation unit 102 determines that there are falling edges D at time points when the electric power change amount dP is smaller than a threshold value −th.

Figure 9:
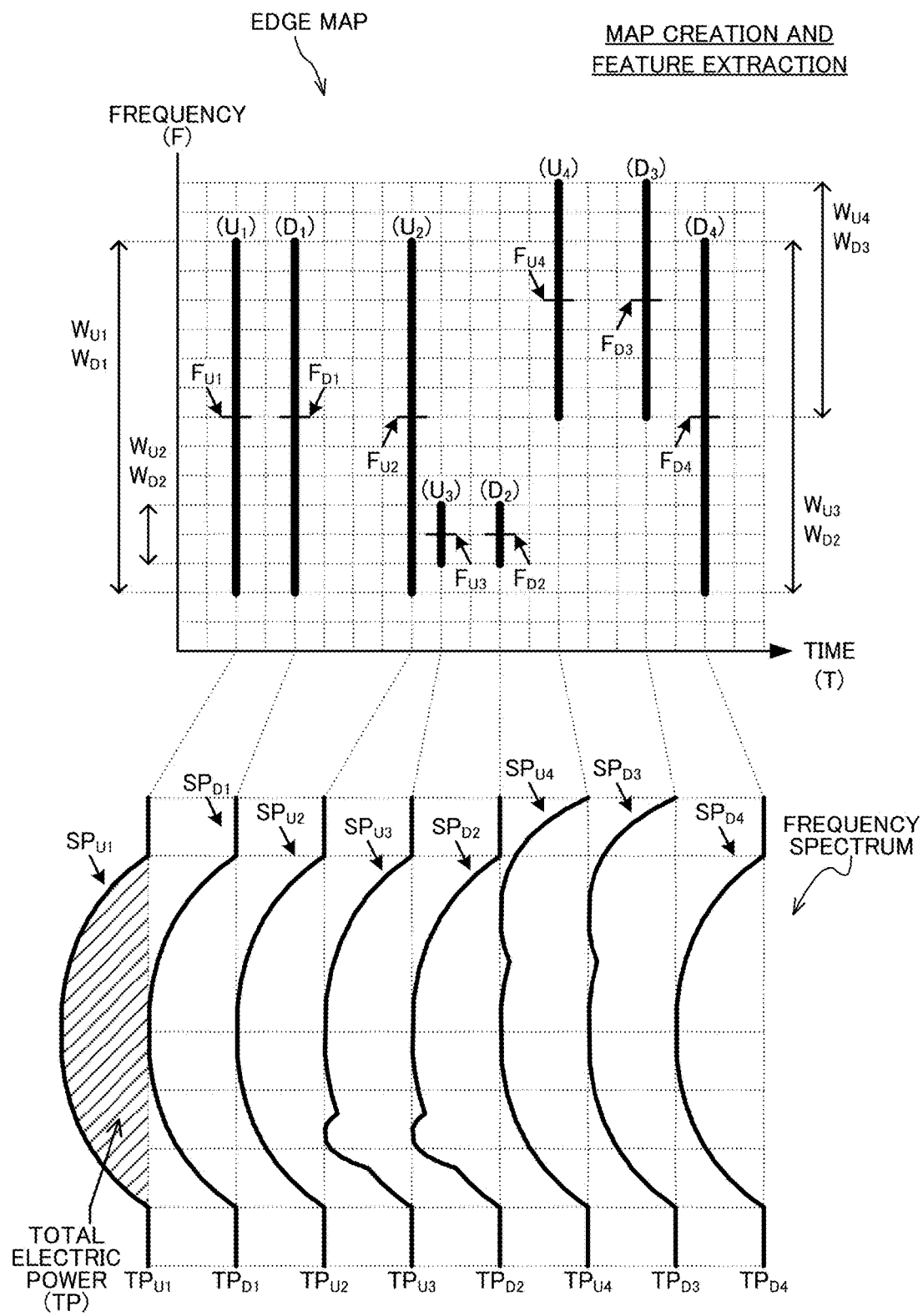
FIG. 9 is a diagram for describing a map creation and feature extraction method according to the second embodiment.

The map generation unit 102 detects the rising edges U and the falling edges D in all the divided regions and generates an edge map illustrated in FIG. 9. FIG. 9 is a diagram for describing a map creation and feature extraction method according to the second embodiment. An edge map illustrated in FIG. 9 is obtained by analyzing the electric power distribution 101$a$ illustrated in FIG. 7. In the edge map, a plurality of thick lines represent rising edges $U_1$, $U_2$, $U_3$, and $U_4$ and falling edges $D_1$, $D_2$, $D_3$, and $D_4$.

When the edge map is obtained, the band width and the center frequency corresponding to each edge are obtained. In addition, the frequency spectrum at the time point corresponding to each edge is obtained. In the following, the band widths, the center frequencies, and the frequency spectra corresponding to the rising edges $U_k$ (k=1, . . . , 4) are referred to as $W_{Uk}$, $F_{Uk}$, and $SP_{Uk}$, respectively. Also, total electric powers $IT_{Uk}$ are obtained by integrating the electric powers P of the frequency spectra $SP_{Uk}$ in the direction of frequency F. In the same manner, the band widths Wok, the center frequencies $F_{Dk}$, the frequency spectra $SP_{Dk}$, and the total electric powers $TP_{Dk}$ corresponding to the falling edges $D_k$ (k=1, . . . , 4) are obtained.

As illustrated in FIG. 9, a plurality of rising edges ($U_1$, . . . , $U_4$) and a plurality of falling edges ($D_1$, . . . , $D_4$) are included in the edge map. The correspondence relationship between the rising edges U and the falling edges D is not identified in the generated edge map. That is, a pair (edge pair) of a rising edge U and a falling edge D of the same signal component is not identified. Thus, the edge pair identification unit 103 identifies edge pairs on the basis of the band widths $W_{Uk}$ and $W_{Dk}$, the center frequencies $F_{Dk}$ and $F_{Dk}$, the frequency spectra $SP_{Uk}$ and $SP_{Dk}$, and the total electric powers $TP_{Uk}$ and $TP_{Dk}$, which are obtained by the map generation unit 102.

(Identification of Edge Pair)

Figure 10:
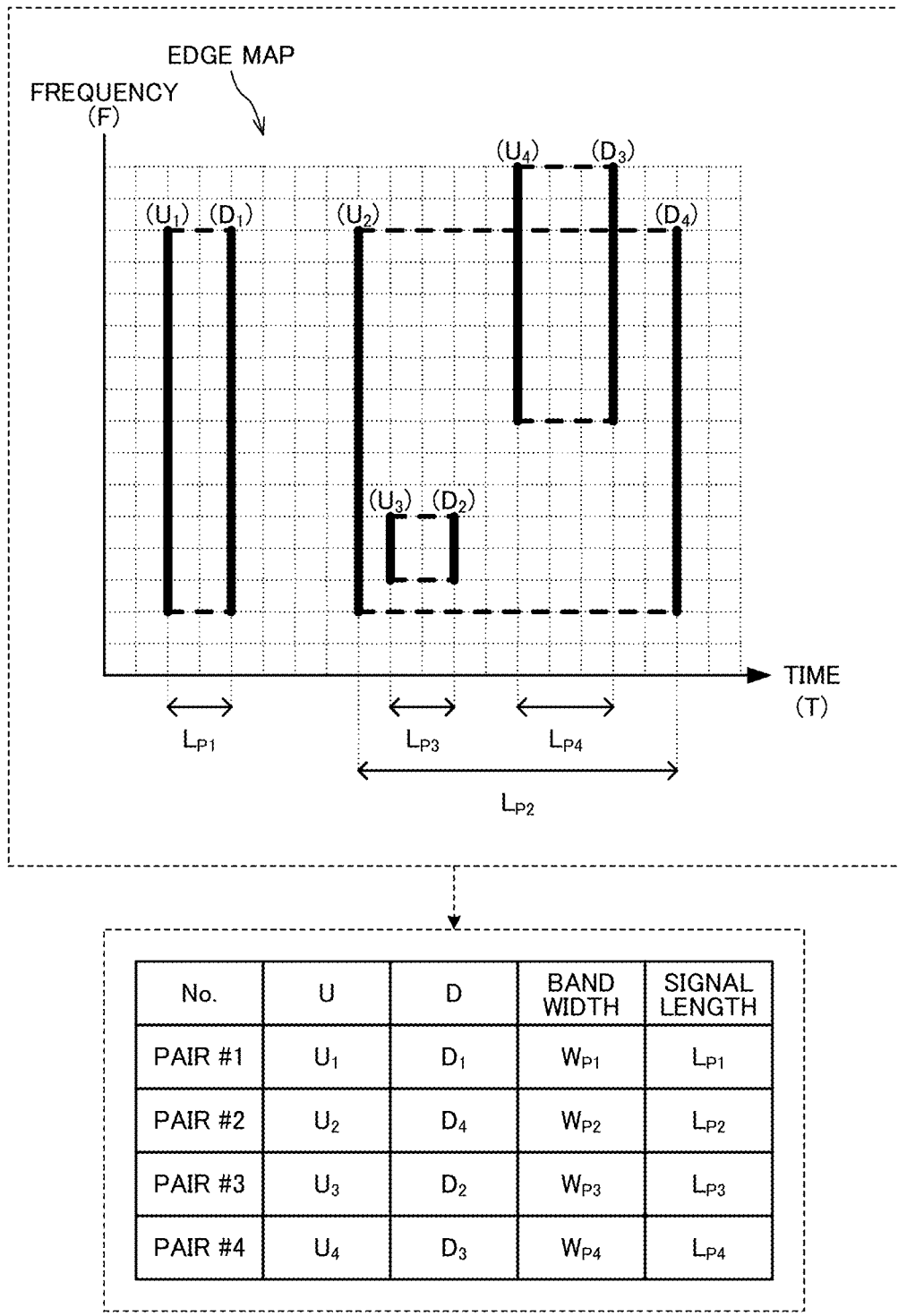
FIG. 10 is a diagram for describing an edge pair identification method according to the second embodiment.

As illustrated in FIG. 10, the edge pair identification unit 103 identifies edge pairs by using the feature values (a part or all of the band widths, the center frequencies, the frequency spectra, and the total electric powers) obtained from the edge map. FIG. 10 is a diagram for describing an edge pair identification method according to the second embodiment.

For example, the edge pair identification unit 103 searches for the falling edge D corresponding to the rising edge $U_2$ on the basis of the frequency spectra. First, the edge pair identification unit 103 calculates a similarity degree between the frequency spectrum $SP_{U2}$ of the rising edge $U_2$ and each of the frequency spectra $SP_{D2}$, $SP_{D3}$, and $SP_{D4}$ of the falling edges $D_2$, $D_3$, and $D_4$ positioned backward from the rising edge $U_2$ on the time axis. For example, the similarity degree of spectrum waveform is obtained by calculating a cross-correlation function between two frequency spectra.

The edge pair identification unit 103 extracts the falling edge D (the falling edge $D_4$ in the example of FIG. 10) whose similarity degree exceeds a predetermined reference value, and identifies the extracted falling edge $D_4$ and the rising edge $U_2$ as an edge pair. With the same method, the edge pair identification unit 103 identifies the rising edge $U_3$ and the falling edge $D_2$ as an edge pair, and the rising edge $U_4$ and the falling edge $D_3$ as an edge pair.

When the falling edge D corresponding to the rising edge $U_1$ is searched for by the above method, the falling edges $D_1$ and $D_4$ whose similarity degree of the frequency spectra exceeds the reference value are detected. When there are a plurality of signal components corresponding to the same wireless standard, a plurality of rising edges U and falling edges D of similar spectrum waveforms are included in the edge map. In this case, the edge pair identification unit 103 selects the falling edge $D_1$ closest to the rising edge $U_1$ and identifies the rising edge $U_1$ and the falling edge $D_1$ as an edge pair.

Note that the above method may be transformed, such that a plurality of edges of similar spectrum waveforms are distinguished by identifying an area (existence area) of a signal component and selecting the falling edge D in the same existence area as the rising edge U, for example. Although the above method utilizes only the similarity degree between the spectrum shapes, the above method may be transformed into a method that additionally utilizes differences between band widths, center frequencies, and total electric powers, for example. These transformations belong to the technical scope of the second embodiment.

The edge pair identification unit 103 stores the information of the edge pairs identified from the edge map, in the memory unit 101. For example, the edge pair identification unit 103 stores, in the memory unit 101, identification information of the edge pairs, identification information of the rising edges U, identification information of the falling edges D, and information of the band widths and the signal lengths of the signal components corresponding to the edge pairs, in association with each other. Note that, when the edge pairs are identified, a rising time point and a falling time point are decided with regard to each signal component, and thus a time interval from the rising time point to the falling time point is obtained.

In the following, the k-th (k=1, . . . , 4) edge pair is denoted by pair #k, and the band width and the signal length corresponding to the pair #k are denoted by $W_{Pk}$ and $L_{Pk}$, respectively. In the example of FIG. 10, the pair of the rising edge $U_1$ and the falling edge $D_1$ is a pair #1, and the pair of the rising edge $U_2$ and the falling edge $D_4$ is a pair #2. Also, the pair of the rising edge $U_3$ and the falling edge $D_2$ is a pair #3, and the pair of the rising edge $U_4$ and the falling edge $D_3$ is a pair #4.

(Detection of Wireless Communication Standard)

The feature detection unit 104 detects the wireless communication standard corresponding to each signal component in the electric power distribution 101a, on the basis of the information of the edge pairs that the edge pair identification unit 103 stores in the memory unit 101 and the standard information 101b stored in the memory unit 101.

For example, the feature detection unit 104 acquires the band width $W_{P1}$ of the pair #1 from the memory unit 101 and extracts the closest band width (for example, $W_1$) from among the band widths $W_1$, $W_2$, and $W_3$. Then, the feature detection unit 104 outputs the information of the wireless communication standard WLAN corresponding to the extracted band width $W_1$, as the wireless communication standard corresponding to the pair #1. In the same way, the feature detection unit 104 outputs the information of the wireless communication standards corresponding to the pairs #2, #3, and #4.

The feature detection unit 104 may count the number of signal components included in the electric power distribution 101a for each wireless communication standard, and output the count number of each wireless communication standard. Note that the output destination of the information is a display screen of the wireless analysis apparatus 100 or a display screen of a user terminal (computer) connected to the wireless analysis apparatus 100 via a network or the like, for example.

(Application Example: Edge Steepness, Bottom of Frequency Spectrum, Search Area, and Edge Overlap)

Heretofore, a case of steep rising edges and steep falling edges has been described for the convenience of description. However, in the actual measured electric power distribution 101a, the rising edges and the falling edges of the electric power are gradual in some cases, due to influence of noise for example. In these cases, the rising edges U and the falling edges D have widths in the time direction. Moreover, bottoms of frequency spectra are elongated in low electric power in some cases. In these cases, the band widths (the lengths in the frequency direction) of the rising edges U and the falling edges D are detected shorter than they actually are.

Figure 11:
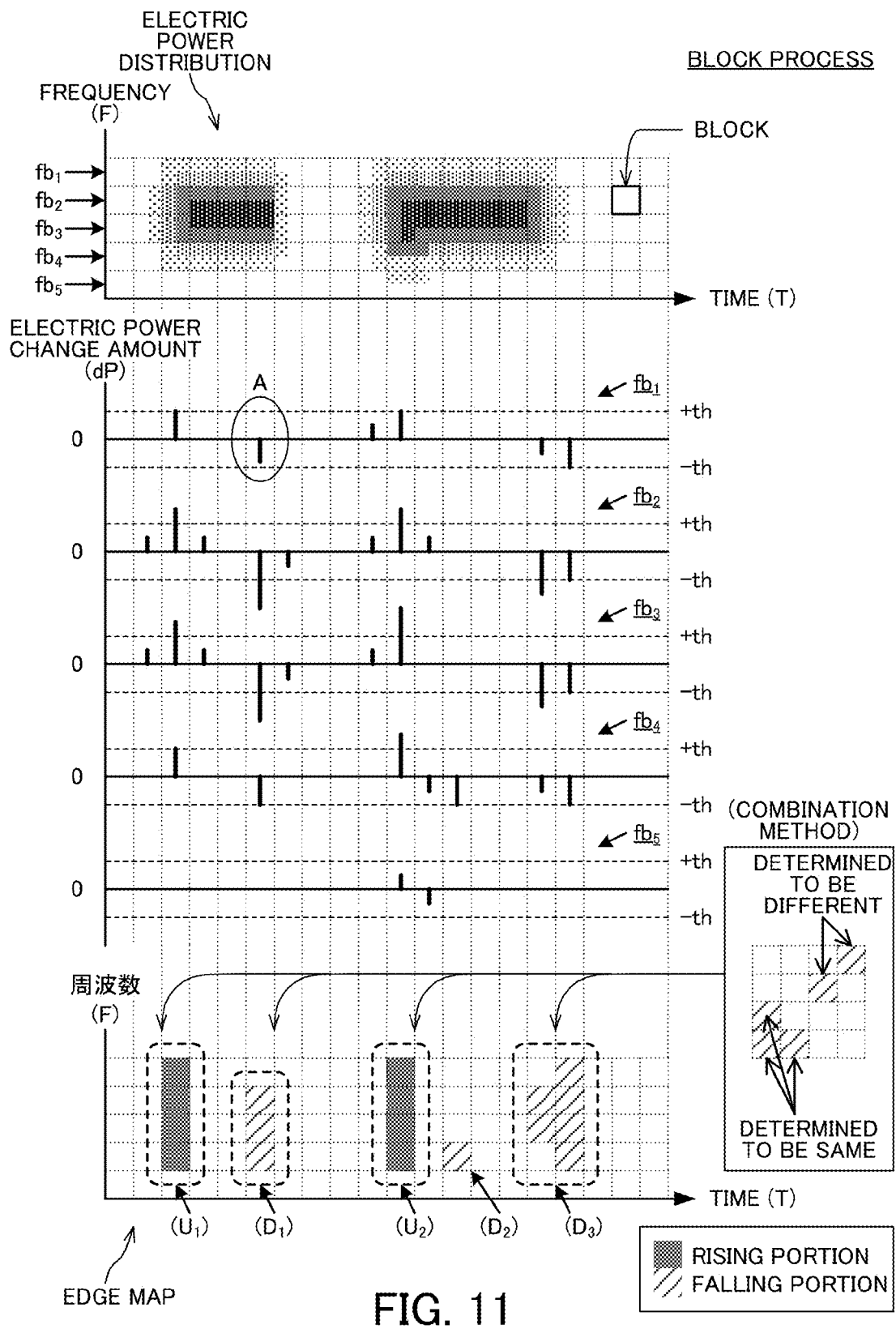
FIG. 11 is a first diagram for describing detail of a block process according to the second embodiment.

In order to consider the steepness of the edges and the elongation of the frequency spectra, the map generation unit 102 compartments the electric power distribution 101a into blocks having predetermined band widths and predetermined time widths, and generates an edge map composed of the blocks, as illustrated in FIG. 11. FIG. 11 is a first diagram for describing detail of a block process according to the second embodiment.

Figure 12:
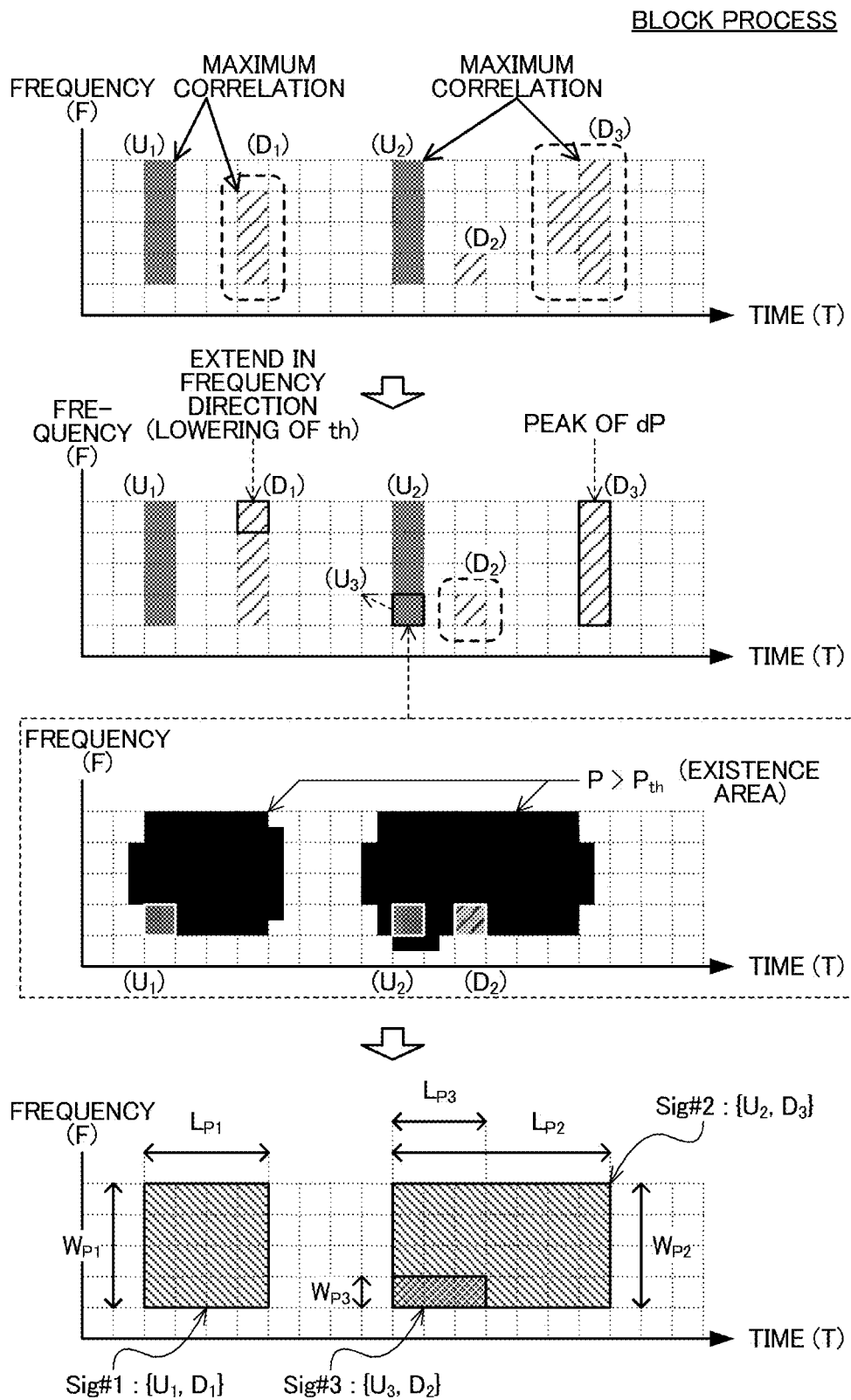
FIG. 12 is a second diagram for describing detail of a block process according to the second embodiment.

Also, the edge pair identification unit 103 identifies edge pairs from the edge map and corrects the rising edges U and the falling edges D of the identified edge pairs as appropriate, as illustrated in FIG. 12. FIG. 12 is a second diagram for describing the detail of the block process according to the second embodiment. In the following, the detail of the process illustrated in FIGS. 11 and 12 will be described sequentially.

FIG. 11 illustrates the electric power distribution 101a that includes a plurality of divided regions corresponding to the bands $fb_1$, $fb_2$, $fb_3$, $fb_4$, and $fb_5$ having the same band widths. In addition, each divided region is divided at predetermined time widths, so that the electric power distribution 101a is compartmented into blocks having predetermined band widths and predetermined time widths. In this case, the map generation unit 102 calculates the electric power change amount dP for each block from the electric power distribution 101a.

Also, the map generation unit 102 determines that the blocks of larger electric power change amounts dP than the threshold value +th correspond to the rising edges U. On the other hand, the map generation unit 102 determines that the blocks of smaller electric power change amounts dP than the threshold value −th correspond to the falling edges D. Note that, in the example of FIG. 11, the blocks with thick hatching in the edge map are the blocks corresponding to the rising edges U. On the other hand, the blocks with thin hatching in the edge map are the blocks corresponding to the falling edges D.

The map generation unit 102 searches for a part in which a plurality of blocks having the same attributes (i.e., rising edge, falling edge) are adjacent to each other, and combines the adjacent blocks (block combination). Here, the map generation unit 102 combines the blocks adjacent in the vertical and horizontal directions, and does not combine the blocks adjacent in the oblique directions. A series of blocks obtained by the block combination is an edge. In the example of FIG. 11, the rising edges $U_1$ and $U_2$ and the falling edges $D_1$, $D_2$, and $D_3$ are obtained.

Note that the falling edge $D_3$ has a width of two blocks in the time direction. Hence, the map generation unit 102 narrows the falling edge $D_3$ down to a series of blocks of a time point at which the electric power change amount dP is at its peak, with reference to the electric power change amount dP of the falling edge $D_3$, as illustrated in FIG. 12. That is, the map generation unit 102 narrows the edge having the width of two or more blocks in the time direction, down to an edge having a width of one block, on the basis of the electric power change amount dP.

When the edge map is obtained by the above method, the edge pair identification unit 103 searches for the falling edges D corresponding to the rising edges $U_1$ and $U_2$ to identify edge pairs. For example, the edge pair identification unit 103 identifies an area (existence area) of a larger electric power P than a predetermined threshold value $P_{th}$ in the electric power distribution 101a, and detects a falling edge D having a feature similar to the rising edge, among the falling edges D in the same existence area as the rising edge U.

In the example of FIG. 12, the falling edge $D_1$ of the largest correlation of frequency spectrum is detected from the same existence area, as the falling edge D forming an edge pair with the rising edge $U_1$. Also, the falling edge $D_3$ of the largest correlation of frequency spectrum is detected in the same existence area, as the falling edge D forming an edge pair with the rising edge $U_2$. In this case, the edge pair of the rising edge $U_1$ and the falling edge $D_1$, and the edge pair of the rising edge $U_2$ and the falling edge $D_3$ are identified.

After identifying the edge pairs for all the rising edges U, the edge pair identification unit 103 searches for an edge that has not formed an edge pair. In the example of FIG. 12, the falling edge $D_2$ does not form an edge pair. In this case, the edge pair identification unit 103 extracts one or more blocks in the same existence area as the falling edge $D_2$, from among the blocks of the rising edges U positioned temporally before the falling edge $D_2$ and in the same band as the falling edge $D_2$.

The rising edges U positioned temporally before the falling edge $D_2$ and in the same band as the falling edge $D_2$ are the rising edges $U_1$ and $U_2$. Further, of the rising edges $U_1$ and $U_2$, the rising edge $U_2$ is in the same existence area as the falling edge $D_2$. Hence, a block of the rising edge $U_2$ in the same band as the falling edge $D_2$ is extracted as the rising edge U (rising edge $U_3$) that forms an edge pair with the falling edge $D_2$.

When a plurality of signal components are superimposed, a plurality of edges can overlap each other, as described above. In this case, there is a risk that one of the edges that forms an edge pair is not found, even with reference to the features, such as band width, center frequency, and spectrum waveform. However, the edge pair is detectable even when the edges overlap, by applying the above method.

Note that there is another applicable method (variant example) in which a series of blocks at a temporal end in the same existence area and the same band as one edge is identified as the other edge. For example, when the falling edge $D_2$ is one of the edges, the other of the edges is a series of blocks positioned at a temporal end (a temporally previous end, because the rising edge U is searched for) in the same existence area as the falling edge $D_2$. In this example, the block positioned temporally one-block before the rising edge $U_2$ is detected as the other of the edges.

When an edge pair is identified, the feature detection unit 104 corrects the band widths of a rising edge U and a falling edge D that forms an edge pair. For example, the falling edge $D_1$ has a shorter band width (the length in the frequency direction) than the rising edge $U_1$ that forms an edge pair with the falling edge $D_1$. This is because the electric power change amount dP is slightly larger than the threshold value −th at a part corresponding to the band $fb_1$ of FIG. 11 and indicated with a reference sign A in the graph of the electric power change amount dP, and therefore is not determined to be a part of the falling edge D.

If there is an influence of noise, it is possible that the absolute value of the electric power change amount dP is slightly smaller than the threshold value th at a part (bands $fb_1$, $fb_4$, and $fb_5$ in the example of FIG. 11) corresponding to the bottoms of frequency spectrum, as described above. When the length of the edge is evaluated to be shorter than it actually is, there is a risk that a shorter band width than in reality is detected as the feature of the signal component corresponding to the edge, resulting in erroneous estimation of the wireless communication standard. Thus, the feature detection unit 104 lowers the threshold value th (for example, to a half of th) and determines the blocks corresponding to the edge on the basis of the electric power change amount dP at the edge and the threshold value th after lowering.

In the example of FIG. 11, the block corresponding to the part of the reference sign A illustrated in the graph of the electric power change amount dP is determined to be a block of the rising edge U as a result of determination using the threshold value th after lowering. Then, as illustrated in FIG. 12, the falling edge $D_1$ is elongated in the frequency direction. After correcting the length of the edge in the frequency direction by this method, the feature detection unit 104 assumes a group of blocks sandwiched by the edge pair as a signal component, and extracts the feature values of the signal component.

In the example of FIG. 12, a group of blocks sandwiched by the rising edge $U_1$ and the falling edge $D_1$ is assumed as a signal component Sig#1, and a band width $W_{P1}$ and a signal length $L_{P1}$ are extracted as the features of Sig#1. Also, a group of blocks sandwiched by the rising edge $U_2$ and the falling edge $D_3$ is assumed as a signal component Sig#2, and a band width $W_{P2}$ and a signal length $L_{P2}$ are extracted as the features of Sig#2.

Also, a group of blocks sandwiched by the rising edge $U_3$ and the falling edge $D_2$ is assumed as a signal component Sig#3, and a band width $W_{P3}$ and a signal length $L_{P3}$ are extracted as the features of Sig#3. As described above, Sig#3 is completely superimposed on Sig#2, but Sig#2 and Sig#3 are properly separated by applying the above method.

In the above, the function of the wireless analysis apparatus 100 has been described.

[2-4. Sequence of Process]

Next, the sequence of the process executed by the wireless analysis apparatus 100 will be described with reference to FIGS. 13 to 15.

Figure 13:
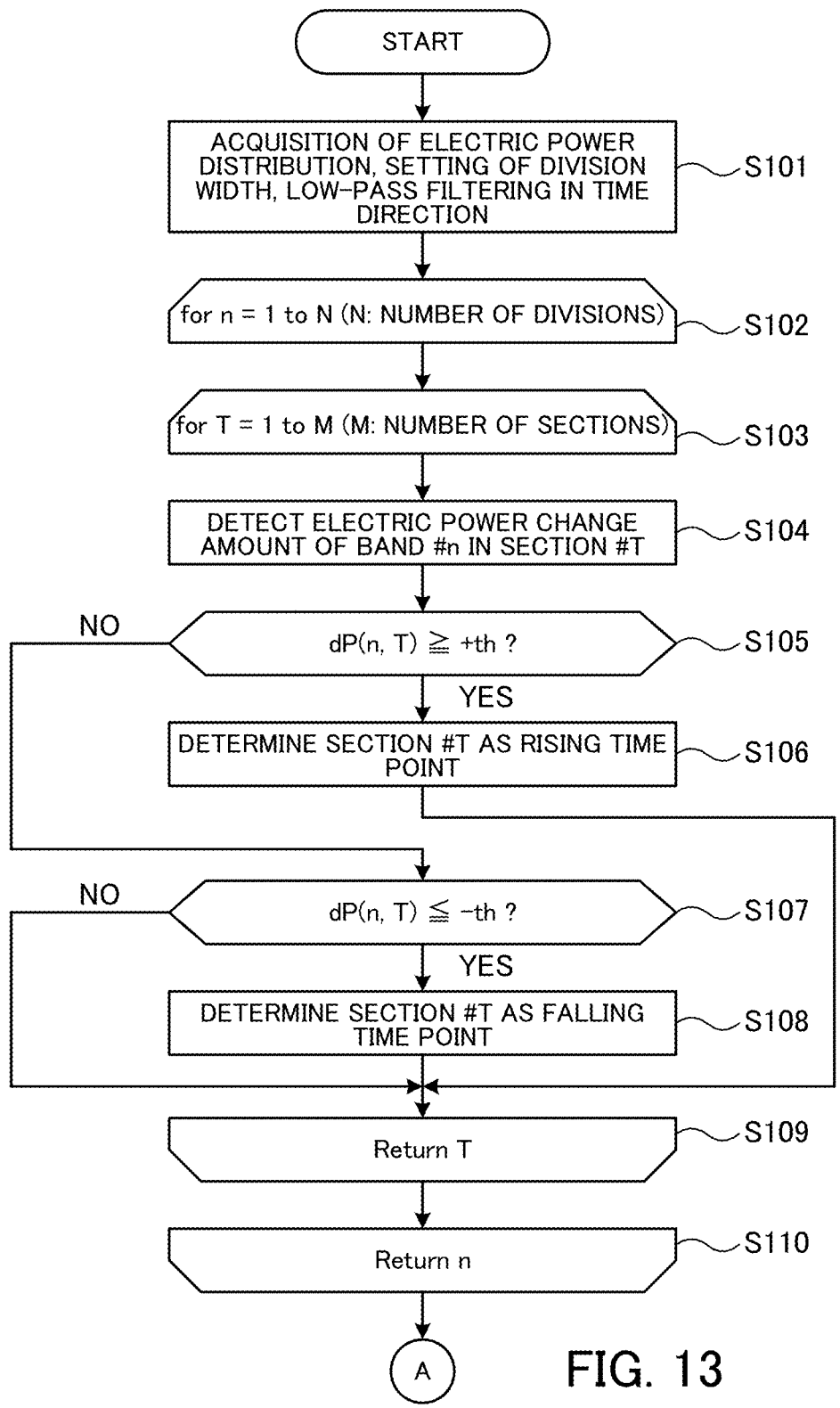
FIG. 13 is a first flow diagram that illustrates a sequence of a process executed by a wireless analysis apparatus according to the second embodiment.

FIG. 13 is a first flow diagram that illustrates the sequence of the process executed by the wireless analysis apparatus according to the second embodiment. FIG. 14 is a second flow diagram that illustrates the sequence of the process executed by the wireless analysis apparatus according to the second embodiment. FIG. 15 is a third flow diagram that illustrates the sequence of the process executed by the wireless analysis apparatus according to the second embodiment.

(S101) The map generation unit 102 acquires information of the electric power distribution 101a output from the receiver 110, from the memory unit 101. Also, the map generation unit 102 sets a division width (the band widths of divided regions) of the electric power distribution 101a. Note that the division width is set equal to or smaller than the narrowest band width among the band widths of the wireless communication standards included in the standard information 101b. The map generation unit 102 performs low-pass filtering for removing high-frequency oscillation in the time direction to each block of the electric power distribution 101a.

(S102, S110) The map generation unit 102 repeatedly executes S103 to S109 by changing, from 1 to N, the parameter n that indicates the n-th band (band #n). Note that N is the number of divided regions (the number of division) obtained by dividing the electric power distribution 101a at intervals of the division width set in S101. If the parameter n is N and the process proceeds to S110, the process proceeds to S111.

(S103, S109) The map generation unit 102 repeatedly executes S104 to S108 by changing, from 1 to M, the parameter T that indicates the T-th section (section #T) on the time axis. Note that M is the number of sections in the electric power distribution 101a analyzed by the wireless analysis apparatus 100. Also, the length of each section corresponds to the width of a block in the time axis direction as illustrated in FIG. 11. If the parameter T is M and the process proceeds to S109, the process proceeds to S110.

(S104) The map generation unit 102 detects the electric power change amount of the band #n in the section #T. That is, the map generation unit 102 detects an electric power change amount dP(n, T) which is a difference between the electric power P(n, T) of a first block corresponding to the band #n and the section #T and the electric power P(n, T-1) of a second block positioned immediately before the first block. For example, dP(n, T) is calculated by "dP(n, T)=P(n, T)−P(n, T-1)".

(S105) The map generation unit 102 determines whether or not dP(n, T) is equal to or larger than the threshold value +th. Note that the threshold value th is set in advance. If dP(n, T) is equal to or larger than the threshold value +th, the process proceeds to S106. On the other hand, if dP(n, T) is not equal to or larger than the threshold value +th, the process proceeds to S107.

(S106) The map generation unit 102 determines the section #T as a rising time point. That is, the map generation unit 102 determines that the block of the band #n and the section #T corresponds to a rising edge U, and records the block in the edge map as a block of the rising edge U. If S106 is completed, the process proceeds to S109.

(S107) The map generation unit 102 determines whether or not dP(n, T) is equal to or smaller than the threshold value −th. If dP(n, T) is equal to or smaller than the threshold value −th, the process proceeds to S108. On the other hand, if dP(n, T) is not equal to or smaller than the threshold value −th, the process proceeds to S109.

(S108) The map generation unit 102 determines that the section #T is a falling time point. That is, the map generation unit 102 determines that the block of the band #n and the section #T corresponds to a falling edge D, and records the block in the edge map as a block of the falling edge D. If S108 is completed, the process proceeds to S109.

(S111) The map generation unit 102 combines the blocks recorded as the edges in the edge map, by the method illustrated in FIG. 11. For example, the map generation unit 102 selects one of the blocks of a rising edge U and extracts blocks of the rising edge U that are adjacent to the selected block in the vertical and horizontal directions. Then, the map generation unit 102 combines the selected block and the extracted blocks (the adjacent blocks). In the same way, the map generation unit 102 sequentially selects each block of the rising edges U and combines the selected block and the adjacent blocks.

With regard to the blocks of the falling edges D as well, the map generation unit 102 sequentially selects each block of a falling edge D, and extracts blocks of the falling edge D that are adjacent to the selected block in the vertical and horizontal directions. Then, the map generation unit 102 combines the selected block and the extracted blocks (the adjacent blocks). As described above, the map generation unit 102 combines the adjacent blocks of the same attribute (i.e., rising edge, falling edge), and recognizes a series of combined blocks as one edge.

(S112) The map generation unit 102 adjusts, to one block, the edge widths of the rising edges U and the falling edges D having widths (edge widths) of two or more blocks in the time direction, among the rising edges U and the falling edges D composed of combined blocks.

For example, the map generation unit 102 searches for a rising edge U having an edge width of two or more blocks, among the rising edges U composed of combined blocks. If the rising edge U having the edge width of two or more blocks is detected, the map generation unit 102 executes a process for narrowing the edge width of the detected rising edge U by the method illustrated in FIG. 12. For example, the map generation unit 102 detects the peak (the maximum value) of the electric power change amount dP in the sections of the detected rising edge U, and sets as a rising edge U a series of blocks positioned at the section of the detected peak.

Also, the map generation unit 102 searches for a falling edge D having an edge width of two or more blocks, among the falling edges D composed of combined blocks. If the falling edge D having the edge width of two or more blocks is detected, the map generation unit 102 executes a process for narrowing the edge width of the detected falling edge D by the method illustrated in FIG. 12. For example, the map generation unit 102 detects the peak (the minimum value) of the electric power change amount dP in the sections of the detected falling edge D, and sets as a falling edge D a series of blocks positioned at the section of the detected peak.

(S113) The edge pair identification unit 103 detects areas (existence area) of signal components from the electric power distribution 101*a*. For example, the edge pair identification unit 103 detects, as the above existence area, an area composed of blocks having larger electric powers P than a predetermined threshold value $P_{th}$ in the electric power distribution 101*a*, as illustrated in FIG. 12.

(S114) The edge pair identification unit 103 selects a rising edge U that has not been selected, from the edge map.

(S115) The edge pair identification unit 103 detects a falling edge D having a feature similar to the selected rising edge U, among the falling edges D in the same existence area as the selected rising edge U. For example, the edge pair identification unit 103 detects a falling edge D having a spectrum shape similar to the frequency spectrum of the selected rising edge U.

Note that, instead of the method that determines a similarity degree between spectrum shapes by using cross-correlation between frequency spectra, the falling edge D may be detected by a method (variant example) that detects the falling edge D of the closest band width and center frequency, for example. Also, the falling edge D may be detected by a method (variant example) that extracts falling edges D having smaller differences in band width and center frequency than a predetermined reference value and extracts the falling edge D having the closest total electric power from the extracted falling edges D.

(S116) The edge pair identification unit 103 determines whether or not the falling edge D having the feature similar to the selected rising edge U is detected. If the similar falling edge D is detected, the process proceeds to S117. If the similar falling edge D is not detected, the process proceeds to S118.

(S117) The edge pair identification unit 103 associates the selected rising edge U and the detected falling edge D as an edge pair. Note that the information of the edge pair is stored in the memory unit 101. If S117 is completed, the process proceeds to S120.

(S118) The edge pair identification unit 103 extracts a portion of the falling edge corresponding to the selected rising edge U (a series of blocks in the same band as the rising edge U), among the falling edges D in the same existence area, as the selected rising edge U. Note that the extracted portion is the falling edge D that forms an edge pair with the rising edge U, and thus the falling edges D positioned backward from the rising edge U are the target of extraction.

Note that, if the series of blocks in the same band as the rising edge U is unable to be extracted from the falling edges D, the edge pair identification unit 103 extracts a series of blocks positioned at the end of the same existence area as the rising edge U, as the portion corresponding to the rising edge U. Note that the extracted portion is the falling edge D that forms an edge pair with the rising edge U, and thus the end of the existence area positioned temporally backward from the rising edge U is the target of extraction.

(S119) The edge pair identification unit 103 associates the selected rising edge U and the extracted portion (a series of blocks that forms the falling edge D) as an edge pair. Note that the information of the edge pair is stored in the memory unit 101. If S119 is completed, the process proceeds to S120.

(S120) The edge pair identification unit 103 determines whether or not all the rising edges U have been selected. If all the rising edges U in the edge map have been selected, the process proceeds to S121. On the other hand, if there is a rising edge U that has not been selected, the process proceeds to S114.

(S121) The edge pair identification unit 103 determines whether or not there is a falling edge D that has not formed an edge pair (an unpaired falling edge D). If there is an unpaired falling edge D (if there is a falling edge D like the falling edge $D_2$ illustrated in FIG. 12), the process proceeds to S122. On the other hand, if there is no unpaired falling edge D, the process proceeds to S126.

(S122) The edge pair identification unit 103 selects an unpaired falling edge D.

(S123) The edge pair identification unit 103 extracts a portion of the rising edge corresponding to the falling edge D (a series of blocks in the same band as the falling edge D) among the rising edges U in the same existence area as the selected falling edge D. Note that the extracted portion is the rising edge U that forms an edge pair with the falling edge D, and thus the rising edges U positioned temporally forward from the falling edge D is the target of extraction.

(S124) The edge pair identification unit 103 associates the selected falling edge D and the extracted portion (the series of blocks that forms the rising edge U) as an edge pair. Note that the information of the edge pair is stored in the memory unit 101. If S124 is completed, the process proceeds to S125.

(S125) The edge pair identification unit 103 determines whether or not all the unpaired falling edges D have been selected. If all the unpaired falling edges D have been selected, the process proceeds to S126. On the other hand, if there is an unpaired falling edge D that has not been selected, the process proceeds to S122.

(S126) The feature detection unit 104 adjusts the edge lengths (the lengths in the frequency direction) of the rising edges U and the falling edges D. For example, the feature detection unit 104 lowers the threshold value th, as illustrated in FIG. 12 (for example, to a half of th). Then, the feature detection unit 104 adjusts the length of a rising edge U, in such a manner that the blocks having electric power change amounts dP equal to or larger than the threshold value +th are set as the rising edge U by using the threshold value th after lowering. Also, the feature detection unit 104 adjusts the length of a falling edge D, in such a manner that the blocks having electric power change amounts dP equal to or smaller than the threshold value -th are set as the falling edge D by using the threshold value th after lowering. The edge lengths are adjusted by this process.

(S127) The feature detection unit 104 extracts the features of the signal component that corresponds to each pair. For example, the feature detection unit 104 extracts the band widths ($W_{P1}$, $W_{P2}$, and $W_{P3}$) and the signal lengths ($L_{P1}$, $L_{P2}$, and $L_{P3}$) as the features of the signal components (Sig#1, #2, #3 in the example of FIG. 12).

Then, the feature detection unit 104 identifies the wireless communication standard corresponding to the extracted features on the basis of the standard information 101b. For example, the feature detection unit 104 selects the band width closest to the band width $W_{P1}$ from among $W_1$, $W_2$, and $W_3$, and extracts the wireless communication standard corresponding to the selected band width from the standard information 101b.

Figure 14:
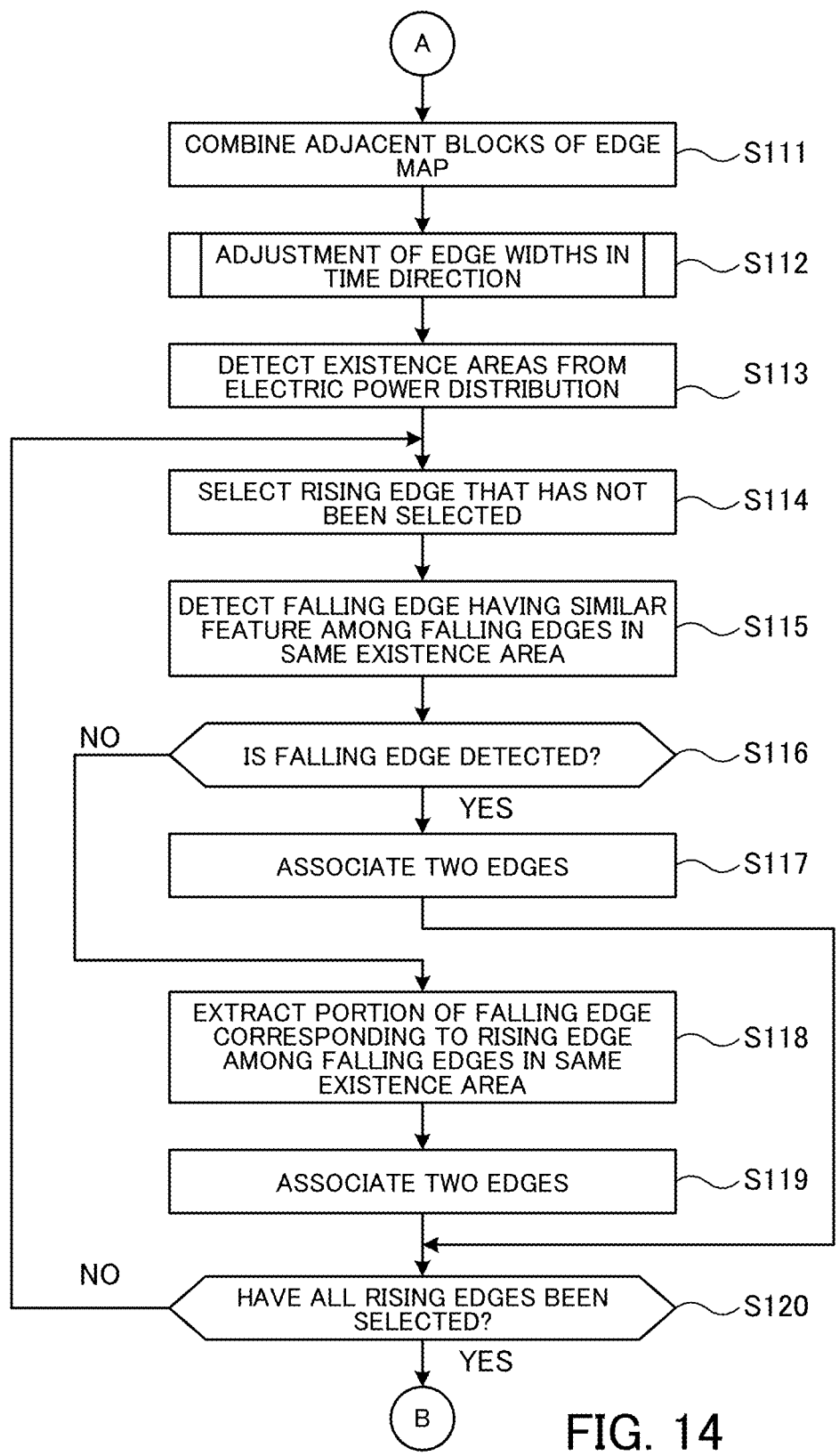
FIG. 14 is a second flow diagram that illustrates a sequence of a process executed by a wireless analysis apparatus according to the second embodiment.
Figure 15:
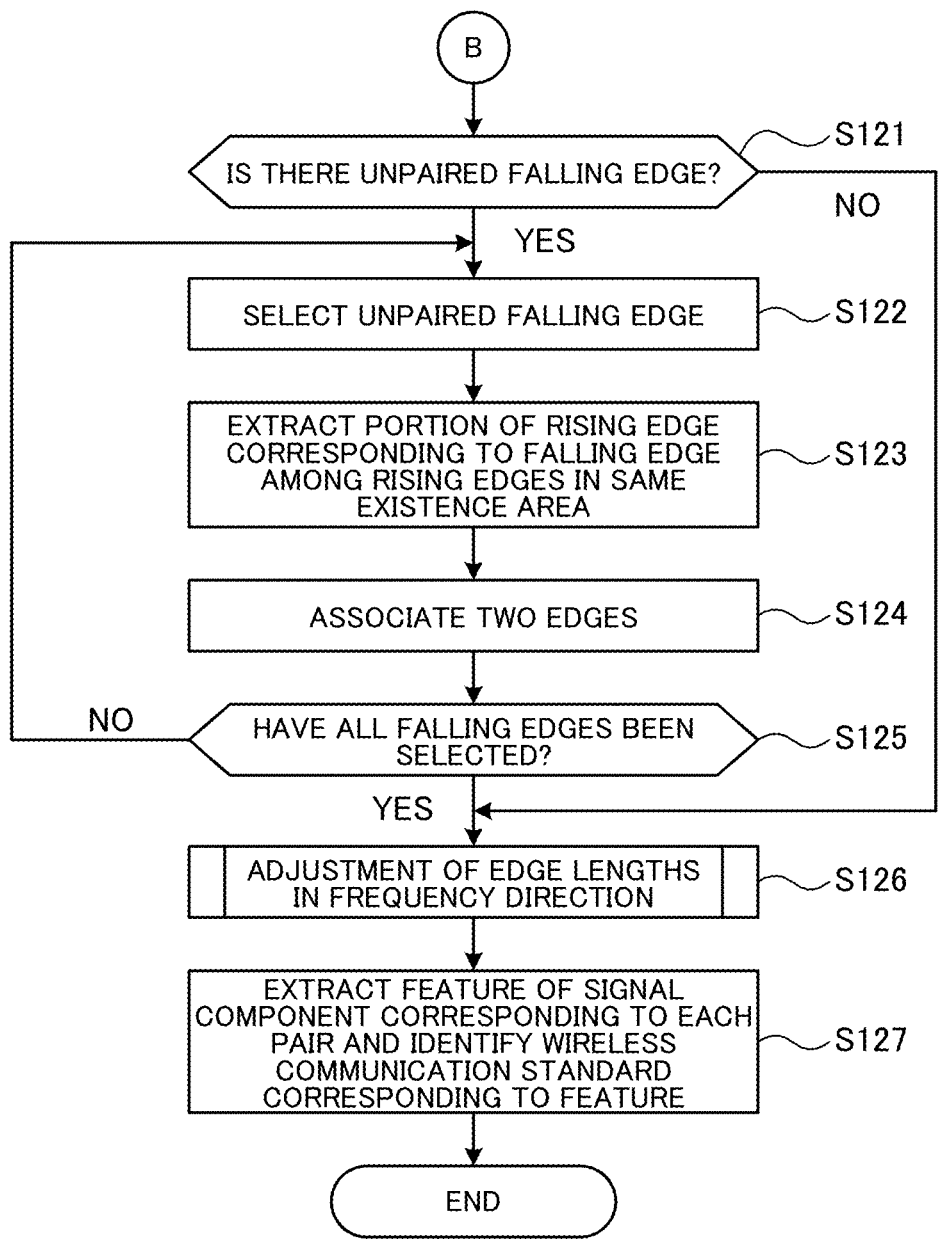
FIG. 15 is a third flow diagram that illustrates a sequence of a process executed by a wireless analysis apparatus according to the second embodiment.

If S127 is completed, the series of process steps illustrated in FIGS. 13 to 15 ends. In the following, S112 and S126 will be described further.

(Adjustment of Edge Width)

Figure 16:
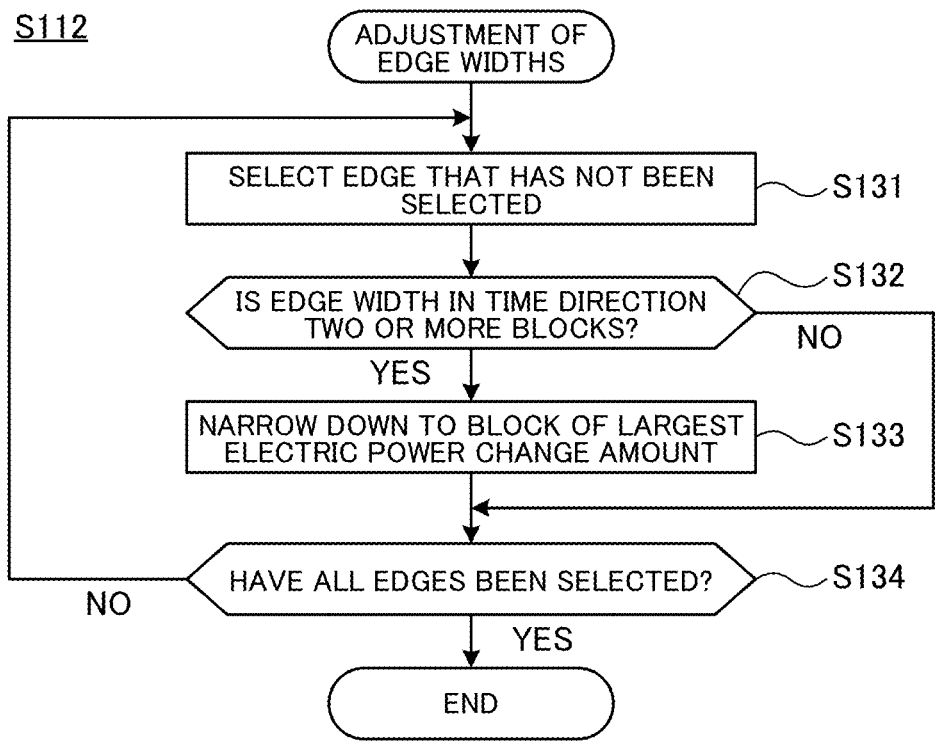
FIG. 16 is a flow diagram that illustrates a sequence of a process relevant to edge width adjustment among processes executed by a wireless analysis apparatus according to the second embodiment.

Here, the sequence of the process relevant to adjustment of edge widths will be described with reference to FIG. 16. FIG. 16 is a flow diagram that illustrates the sequence of the process relevant to adjustment of edge widths, among the processes executed by the wireless analysis apparatus according to the second embodiment.

Note that a series of process steps illustrated in FIG. 16 corresponds to above S112. Also, a series of process steps illustrated in FIG. 16 is executed to both of the rising edges U and the falling edges D. In the description of FIG. 16, the rising edges U and the falling edges D are collectively referred to as "edge" simply.

(S131) The map generation unit 102 selects an edge that has not been selected, from the edge map.

(S132) The map generation unit 102 determines whether or not there is an edge portion (band) having an edge width of two or more blocks, in the selected edge. If there is an edge portion having an edge width of two or more blocks, the process proceeds to S133. On the other hand, if there is no edge portion having an edge width of two or more blocks, the process proceeds to S134.

(S133) The map generation unit 102 divides the selected edge at each time point (into sections on the time axis) and generates a plurality of divided edges having edge widths of one block. Also, the map generation unit 102 calculates the sum of absolute values of the electric power change amounts dP of all the blocks in each of the divided edges. Then, the map generation unit 102 selects the divided edge of the largest sum of absolute values of the electric power change amounts dP, and deletes other divided edge or divided edges from the edge map. That is, the map generation unit 102 narrows the edge down to a series of blocks of the largest electric power change amount dP.

(S134) The map generation unit 102 determines whether or not all the edges in the edge map have been selected. If all the edges have been selected, the series of process steps illustrated in FIG. 16 ends. On the other hand, if there is an edge that has not been selected, the process proceeds to S131.

(Adjustment of Edge Length)

Figure 17:
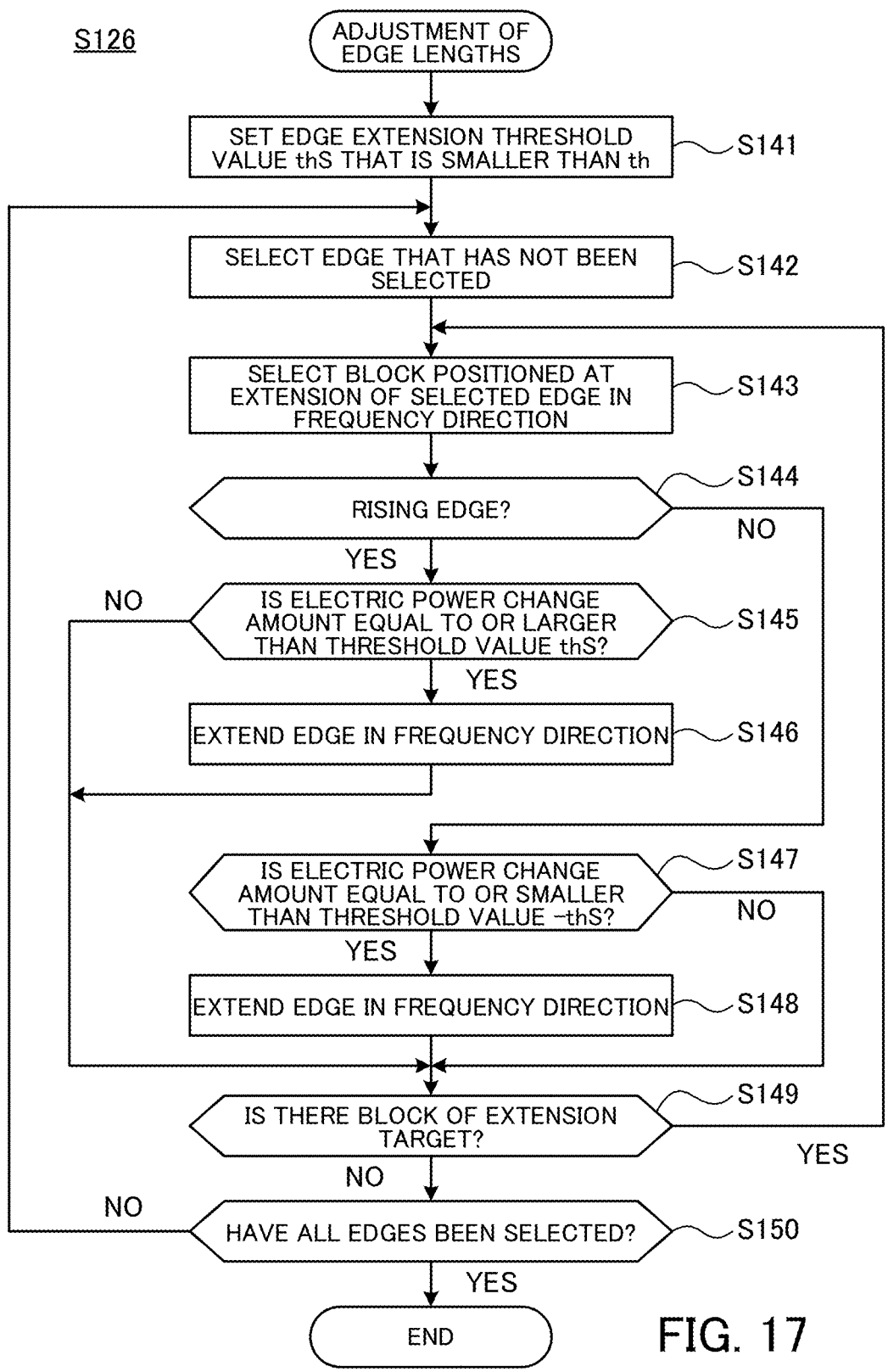
FIG. 17 is a flow diagram that illustrates a sequence of a process relevant to edge length adjustment among processes executed by a wireless analysis apparatus according to the second embodiment.

Here, the sequence of the process relevant to adjustment of edge lengths will be described with reference to FIG. 17. FIG. 17 is a flow diagram that illustrates the sequence of the process relevant to adjustment of edge lengths, among the processes executed by the wireless analysis apparatus according to the second embodiment.

Note that a series of process steps illustrated in FIG. 17 corresponds to above S126. Also, the series of the process steps illustrated in FIG. 17 is executed to both of the rising edges U and the falling edges D. In the description relevant to FIG. 17, the rising edges U and the falling edges D are collectively referred to as "edge" simply.

(S141) The edge pair identification unit 103 sets an edge extension threshold value thS (the above threshold value th after lowering). For example, the edge pair identification unit 103 sets a smaller value than the threshold value th (for example, a half of the threshold value th) as the threshold value thS, with reference to the threshold value th utilized to detect an edge on the basis of the electric power change amount dP.

(S142) The edge pair identification unit 103 selects an edge that has not been selected, from the edge map.

(S143) The edge pair identification unit 103 selects a block positioned at an extension of the selected edge in the frequency direction. In this case, the edge pair identification unit 103 selects a block adjacent to the block positioned at an end of the selected edge.

(S144) The edge pair identification unit 103 determines whether or not the selected edge is a rising edge U. If the selected edge is a rising edge U, the process proceeds to S145. On the other hand, if the selected edge is not a rising edge U, the process proceeds to S147.

(S145) The edge pair identification unit 103 determines whether or not the electric power change amount dP is equal to or larger than the threshold value thS, with reference to the electric power change amount dP of the selected block. If the electric power change amount dP is equal to or larger than the threshold value thS, the process proceeds to S146. On the other hand, if the electric power change amount dP is not equal to or larger than the threshold value thS, the process proceeds to S149.

(S146) The edge pair identification unit 103 recognizes that the selected block is a rising edge U, and extends the edge in the frequency direction by the length of the selected block. If S146 is completed, the process proceeds to S149.

(S147) The edge pair identification unit 103 determines whether or not the electric power change amount dP is equal to or smaller than the threshold value –thS, with reference to the electric power change amount dP of the selected block. If the electric power change amount dP is equal to or smaller than the threshold value –thS, the process proceeds to S148. On the other hand, if the electric power change amount dP is not equal to or smaller than the threshold value –thS, the process proceeds to S149.

(S148) The edge pair identification unit 103 recognizes that the selected block is a falling edge D, and extends the edge in the frequency direction by the length of the selected block. If S148 is completed, the process proceeds to S149.

(S149) The edge pair identification unit 103 determines whether or not there is another block of extension target. If there is another block of extension target, the process proceeds to S143. On the other hand, if there is no block of extension target, the process proceeds to S150.

(S150) The edge pair identification unit 103 determines whether or not all the edges in the edge map have been selected. If all the edges in the edge map have been selected, the series of process steps illustrated in FIG. 17 ends. On the other hand, if there is a block that has not been selected in the edge map, the process proceeds to S142.

(Edge Search)

Figure 18:
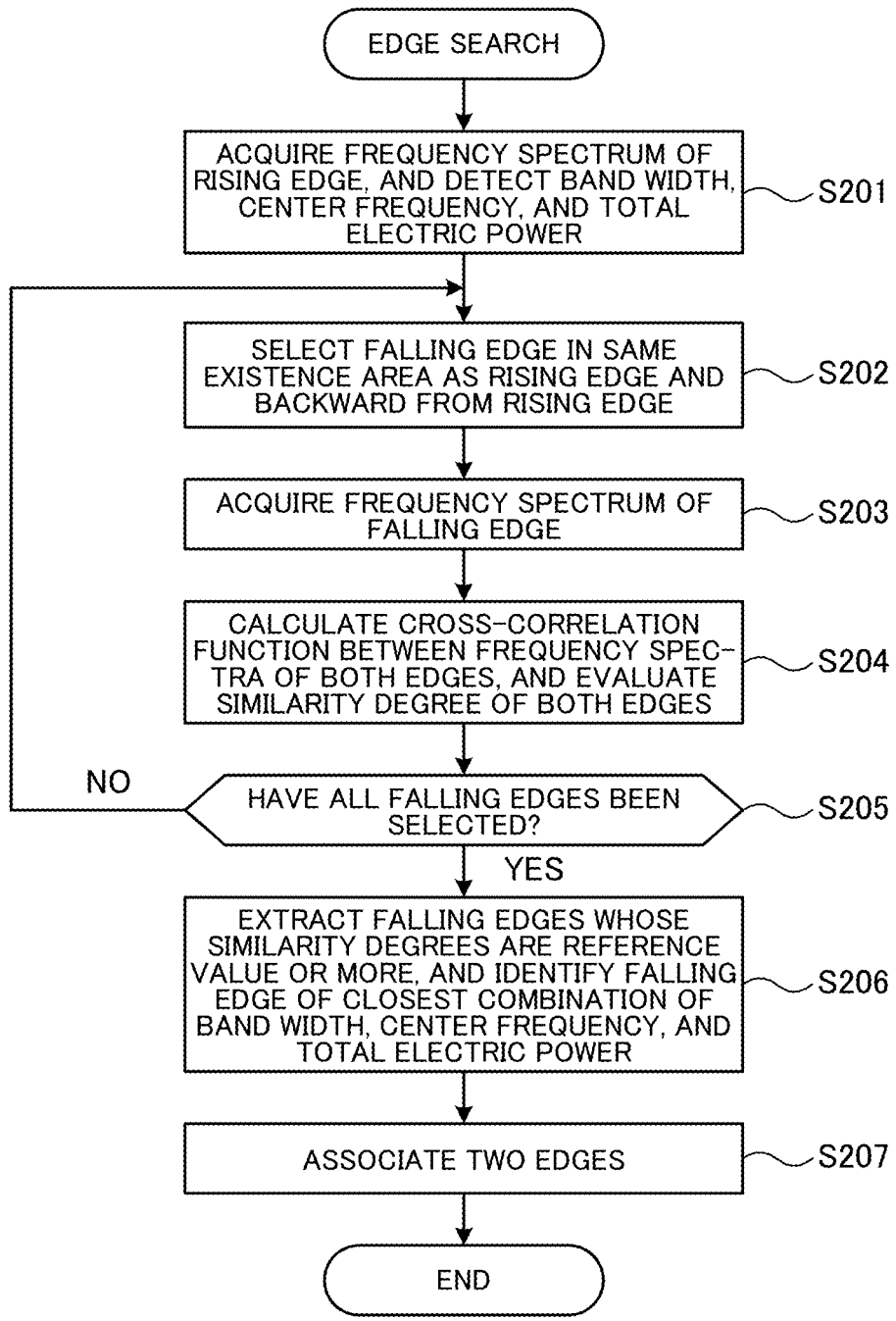
FIG. 18 is a flow diagram that illustrates a sequence of an edge search process executed by a wireless analysis apparatus according to the second embodiment.

Here, the sequence of a process relevant to edge search will be described with reference to FIG. 18. FIG. 18 is a flow diagram that illustrates the sequence of the process relevant to edge search executed by the wireless analysis apparatus according to the second embodiment. Note that the process illustrated in FIG. 18 is a variant example of the method for searching for the falling edge D that forms an edge pair with a certain rising edge U.

(S201) The edge pair identification unit 103 acquires the frequency spectrum of a rising edge U, with reference to the electric power distribution 101a. Then, the edge pair identification unit 103 detects the band width, the center frequency, and the total electric power of the acquired frequency spectrum, as illustrated in FIG. 9.

(S202) The edge pair identification unit 103 selects a falling edge D positioned in the same existence area as the rising edge U and backward from the rising edge U.

(S203) The edge pair identification unit 103 acquires the frequency spectrum of the selected falling edge D, with reference to the electric power distribution 101a.

(S204) The edge pair identification unit 103 calculates a cross-correlation function between the frequency spectra of the rising edge U and the selected falling edge D (both edges), and evaluates the similarity degree between both spectra (two frequency spectra corresponding to both edges). For example, the edge pair identification unit 103 assumes the calculated value of the cross-correlation function as the similarity degree, and determines that there is a correlation between both edges if the similarity degree is equal to or larger than a reference value.

Note that the reference value used in the determination of the similarity degree is obtained by simulation of situations in which signals of a plurality of wireless communication standards in the standard information 101b are mixed, and is set to a value that distinguishes frequency spectra having peaks in specific bands, for example. For example, in the example of FIG. 9, the above reference value is set to distinguish $SP_{U1}$ having a peak in $F_{U1}$, $SP_{U3}$ having a peak in $F_{U3}$, and $SP_{U4}$ having a peak in $F_{U4}$ from each other.

(S205) The edge pair identification unit 103 determines whether or not all the falling edges D positioned in the same existence area as the rising edge U and backward from the rising edge U have been selected. If all the falling edges D have been selected, the process proceeds to S206. On the other hand, if there is a falling edge D that has not been selected, the process proceeds to S202.

(S206) The edge pair identification unit 103 extracts the falling edges D whose similarity degrees are equal to or larger than the reference value, and acquires the band widths, the center frequencies, and the total electric powers of the extracted falling edges D. Then, the edge pair identification unit 103 identifies the falling edge D whose combination of band width, center frequency, and total electric power is closest to the combination of the rising edge U, among the extracted falling edges D.

For example, the edge pair identification unit 103 calculates an absolute difference value of band width, an absolute difference value of center frequency, and an absolute difference value of total electric power, between the rising edge U and the falling edge D, with regard to each of the extracted falling edges D.

The edge pair identification unit 103 narrows the candidates down to the falling edges D having smaller absolute difference values of center frequency than a predetermined first threshold value. Further, the edge pair identification unit 103 narrows the candidates down to the falling edges D having smaller absolute difference values of band width than a predetermined second threshold value. Note that the first threshold value is set to a value that distinguishes center frequencies of different wireless communication standards. The second threshold value is set to a value that distinguishes band widths of different wireless communication standards.

The edge pair identification unit 103 decides the falling edge D of the smallest absolute difference value of total electric power, as the identified falling edge D, from among the narrowed candidates. Note that, if the candidates are narrowed down to one falling edge in the determination of center frequency or band width, the edge pair identification unit 103 decides the falling edge D that remains after the narrowing down, as an identified falling edge D.

(S207) The edge pair identification unit 103 creates an edge pair by associating the rising edge U and the falling edge D identified in S206. If S207 is completed, the series of process steps illustrated in FIG. 18 ends.

In the above, the sequence of the process executed by the wireless analysis apparatus 100 has been described.

The signal components of the respective wireless communication standards are separated from the electric power distribution 101a, by using the above wireless analysis apparatus 100, even when the signals corresponding to a plurality of wireless communication standards are mixed. Hence, the amount of resources utilized by each wireless communication standard, the time points of cross talk, etc. are analyzed, and thus the communication is effectively controlled to reduce the radio wave interference.

In the above, the second embodiment has been described.

According to one aspect, superimposed signals are separated.

All examples and conditional language provided herein are intended for the pedagogical purposes of aiding the reader in understanding the invention and the concepts contributed by the inventor to further art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A wireless analysis apparatus comprising:
  a memory configured to store information of electric power distribution indicating a temporal change of a frequency spectrum; and
  a processor configured to perform a procedure including:
  generating a plurality of divided regions having predetermined band widths by dividing the electric power distribution,
  calculating a temporal change amount of electric power with regard to each of the divided regions, and detecting a rising portion and a falling portion of the electric power, based on the calculated temporal change amount, and
  identifying an individual signal component in the electric power distribution, based on positions of the rising portion and the falling portion in the plurality of divided regions.

2. The wireless analysis apparatus according to claim 1, wherein
  the procedure further includes comparing a feature value of the frequency spectrum at a time of the rising portion with a feature value of the frequency spectrum at a time of the falling portion, detecting a pair of the rising portion and the falling portion whose frequency spectra have similar feature values, and identifying the individual signal component, based on the positions of the detected pair.

3. The wireless analysis apparatus according to claim 2, wherein
  the processor uses at least one of width, center frequency, total electric power, and spectrum shape of the frequency spectrum, as the feature value of the frequency spectrum.

4. The wireless analysis apparatus according to claim 1, wherein
  the procedure further includes setting the predetermined band widths with reference to a narrowest band width among band widths of a plurality of wireless communication standards, in order to identify signal components corresponding to the plurality of wireless communication standards from the electric power distribution.

5. The wireless analysis apparatus according to claim 2, wherein
  the detecting of the pair includes identifying an area of a larger electric power than a predetermined threshold value in the electric power distribution, and detecting a combination of the rising portion and the falling portion in the identified area as the pair.

6. The wireless analysis apparatus according to claim 1, wherein
  the procedure further includes detecting at least one of a signal length and a band width of the identified signal component as a feature property, and determining a wireless communication standard corresponding to the signal component, based on the detected feature property.

7. A wireless analysis method comprising:
  acquiring, by a processor, information of electric power distribution indicating a temporal change of a frequency spectrum from a memory;
  generating, by the processor, a plurality of divided regions having predetermined band widths by dividing the electric power distribution;
  calculating, by the processor, a temporal change amount of electric power with regard to each of the divided regions, and detecting a rising portion and a falling portion of the electric power, based on the calculated temporal change amount; and
  identifying, by the processor, an individual signal component in the electric power distribution, based on positions of the rising portion and the falling portion in the plurality of divided regions.

* * * * *